(12) United States Patent
Frederickson

(10) Patent No.: US 11,612,178 B2
(45) Date of Patent: *Mar. 28, 2023

(54) PRESERVATION METHOD

(71) Applicant: Ryan Phillip Frederickson, Wheaton, IL (US)

(72) Inventor: Ryan Phillip Frederickson, Wheaton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,076

(22) Filed: Mar. 16, 2022

(65) Prior Publication Data

US 2022/0225645 A1 Jul. 21, 2022

Related U.S. Application Data

(63) Continuation of application No. 16/606,119, filed as application No. PCT/US2018/028205 on Apr. 18, 2018, now Pat. No. 11,317,641.

(60) Provisional application No. 62/487,428, filed on Apr. 19, 2017.

(51) Int. Cl.
| | | |
|---|---|---|
| *A23L 3/3445* | (2006.01) | |
| *B65B 31/06* | (2006.01) | |
| *C12H 1/12* | (2006.01) | |
| *B65D 39/00* | (2006.01) | |
| *B65D 51/16* | (2006.01) | |

(52) U.S. Cl.
CPC ............ *A23L 3/3445* (2013.01); *B65B 31/06* (2013.01); *B65D 39/00* (2013.01); *B65D 51/16* (2013.01); *C12H 1/12* (2013.01)

(58) Field of Classification Search
CPC ....... A23L 3/3445; B65B 31/06; B65D 39/00; B65D 51/16; C12H 1/12; C12G 1/02
See application file for complete search history.

(56) References Cited

U.S. PATENT DOCUMENTS

| | | |
|---|---|---|
| 4,477,477 A | 10/1984 | Arter |
| 7,047,762 B2 | 5/2006 | Luzaich et al. |
| 7,562,794 B2 | 7/2009 | Van De Braak et al. |
| 7,712,637 B2 | 5/2010 | Lambrecht |
| 8,523,019 B2 | 9/2013 | Drobot et al. |
| 9,272,834 B2 | 3/2016 | Bazoberry |
| 10,233,068 B2 | 3/2019 | Bazoberry |
| 10,800,589 B2 | 10/2020 | Bazoberry |
| 10,829,279 B2 | 11/2020 | Lutz et al. |
| 11,317,641 B2 * | 5/2022 | Frederickson .......... B65B 31/06 |
| 2005/0142260 A1 | 6/2005 | Chen et al. |
| 2006/0102659 A1 | 5/2006 | Marr et al. |

(Continued)

FOREIGN PATENT DOCUMENTS

GB 2330761 A 5/1999

OTHER PUBLICATIONS

Null, "We Can Drink the Rest Tomorrow: 5 Wine Preservation Systems Tested", Wired, Jul. 6, 2013.

*Primary Examiner* — Nicolas A Arnett
(74) *Attorney, Agent, or Firm* — Erickson Law Group, PC

(57) ABSTRACT

A method of preserving an oxygen sensitive item is disclosed. The method involves injecting at least 0.15 gram of an inert gas into a container comprising the oxygen sensitive item and oxygen, without raising a pressure within the container above 10 psig, to form a barrier layer of the inert gas between the oxygen sensitive item and the oxygen in the container without displacing all of the oxygen from the container.

22 Claims, 22 Drawing Sheets

(56) References Cited

U.S. PATENT DOCUMENTS

| | | |
|---|---|---|
| 2007/0039977 A1 | 2/2007 | Donaldson |
| 2008/0170963 A1 | 7/2008 | Cantrell |
| 2008/0289508 A1 | 11/2008 | Luzaich et al. |
| 2011/0204093 A1 | 8/2011 | Lee |
| 2016/0175781 A1 | 5/2016 | Hubbard, Jr. et al. |
| 2019/0270560 A1 | 9/2019 | Lutz et al. |

\* cited by examiner

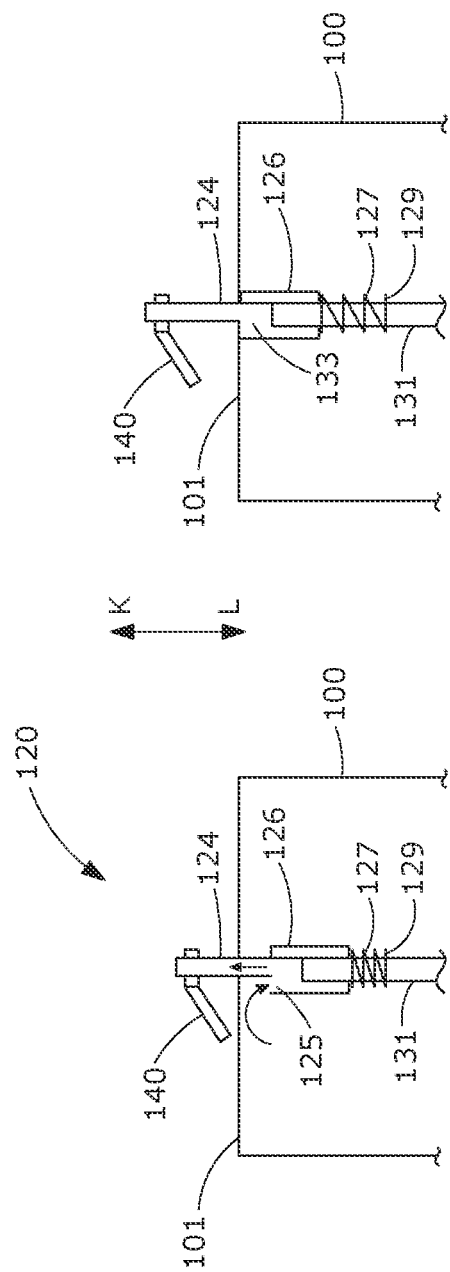

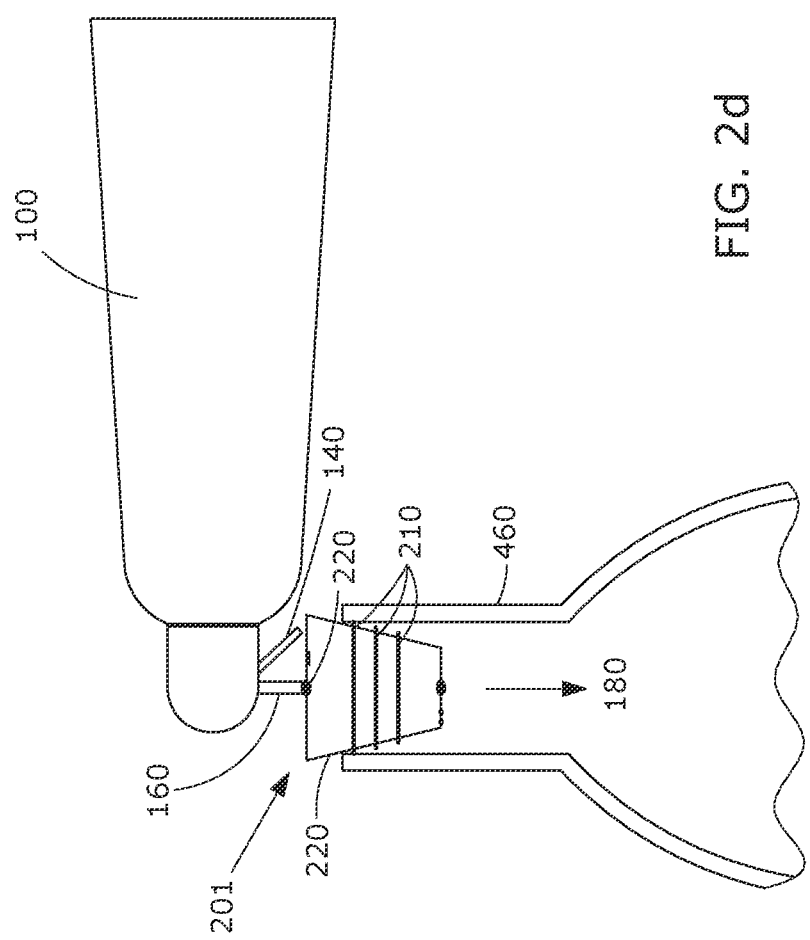

| Bottle Size (mL) | Amt Used | Headspace (L) | Mass Ar (g) | Mol Ar | PP Ar (atm) |
|---|---|---|---|---|---|
| 750 | 90% | 0.675 | 0.61 | 0.0152135 | 0.5442177 |
| 750 | 75% | 0.5625 | 0.51 | 0.0126779 | 0.5442177 |
| 750 | 50% | 0.375 | 0.34 | 0.0084519 | 0.5442177 |
| 750 | 25% | 0.1875 | 0.17 | 0.0042260 | 0.5442177 |
| 750 | 10% | 0.075 | 0.07 | 0.0016904 | 0.5442177 |

FIG. 2ei

| Bottle Size (mL) | Amt Used | Headspace (L) | Mass Ar (g) | Mol Ar | PP Ar (atm) |
|---|---|---|---|---|---|
| 750 | 90% | 0.675 | 0.23 | 0.0057050 | 0.2040816 |
| 750 | 75% | 0.5625 | 0.19 | 0.0047542 | 0.2040816 |
| 750 | 50% | 0.375 | 0.13 | 0.0031695 | 0.2040816 |
| 750 | 25% | 0.1875 | 0.06 | 0.0015847 | 0.2040816 |
| 750 | 10% | 0.075 | 0.03 | 0.0006339 | 0.2040816 |

FIG. 2eii

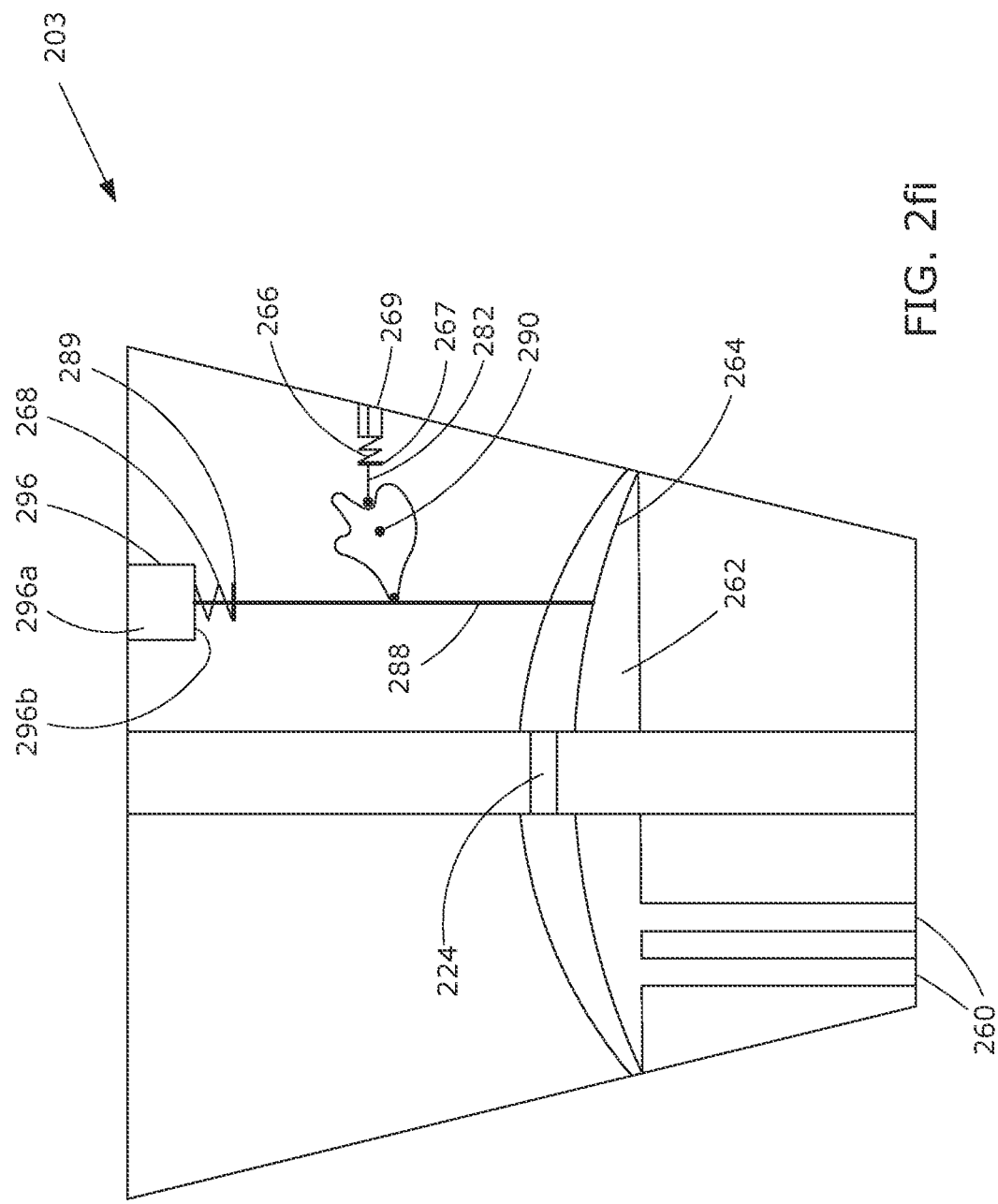

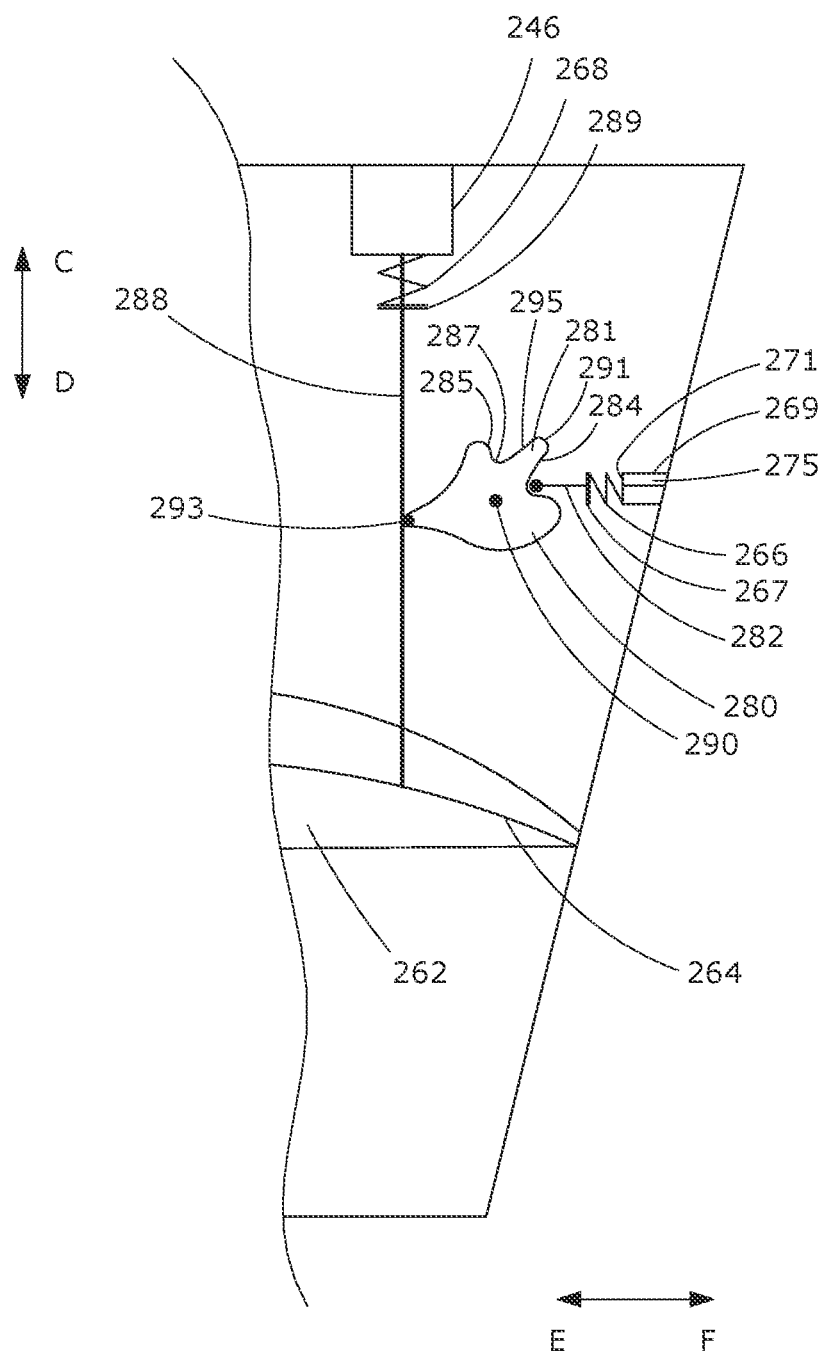
FIG. 2fii

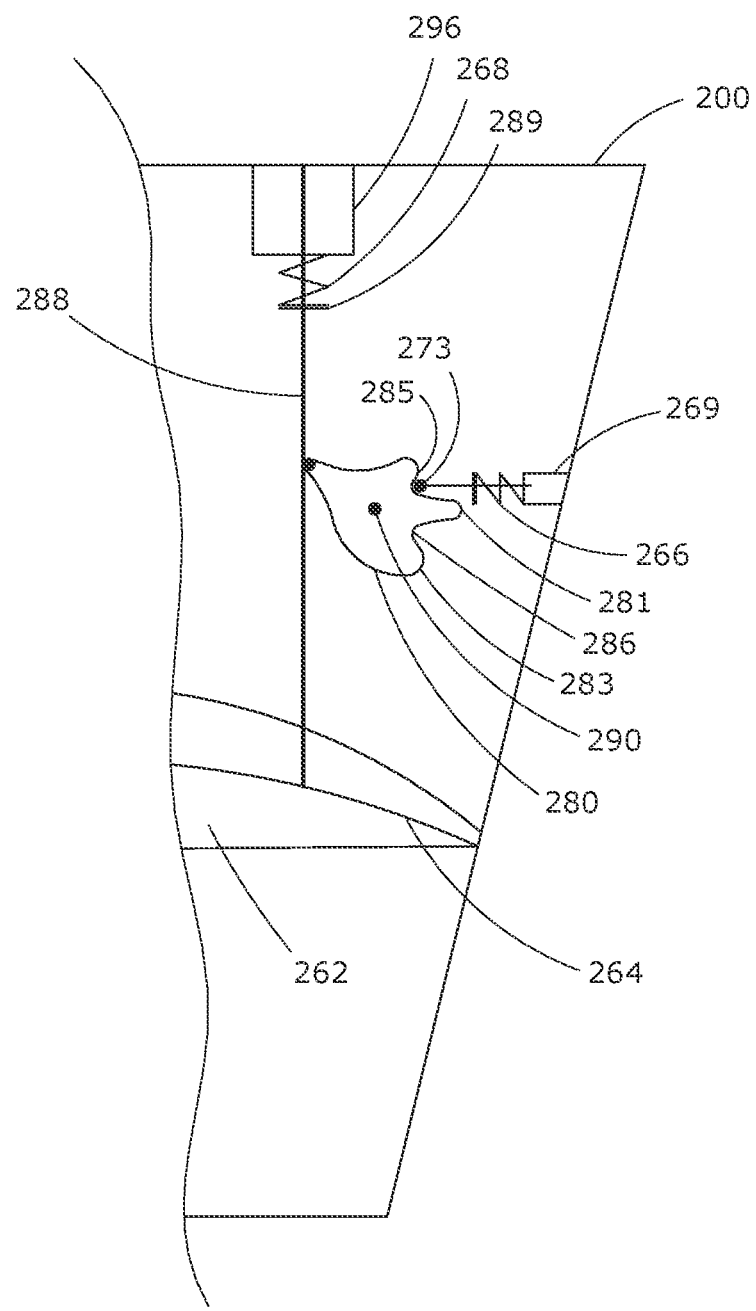
FIG. 2fiii

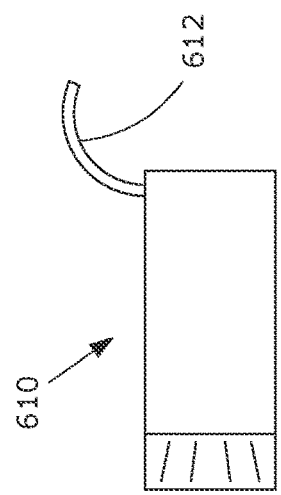
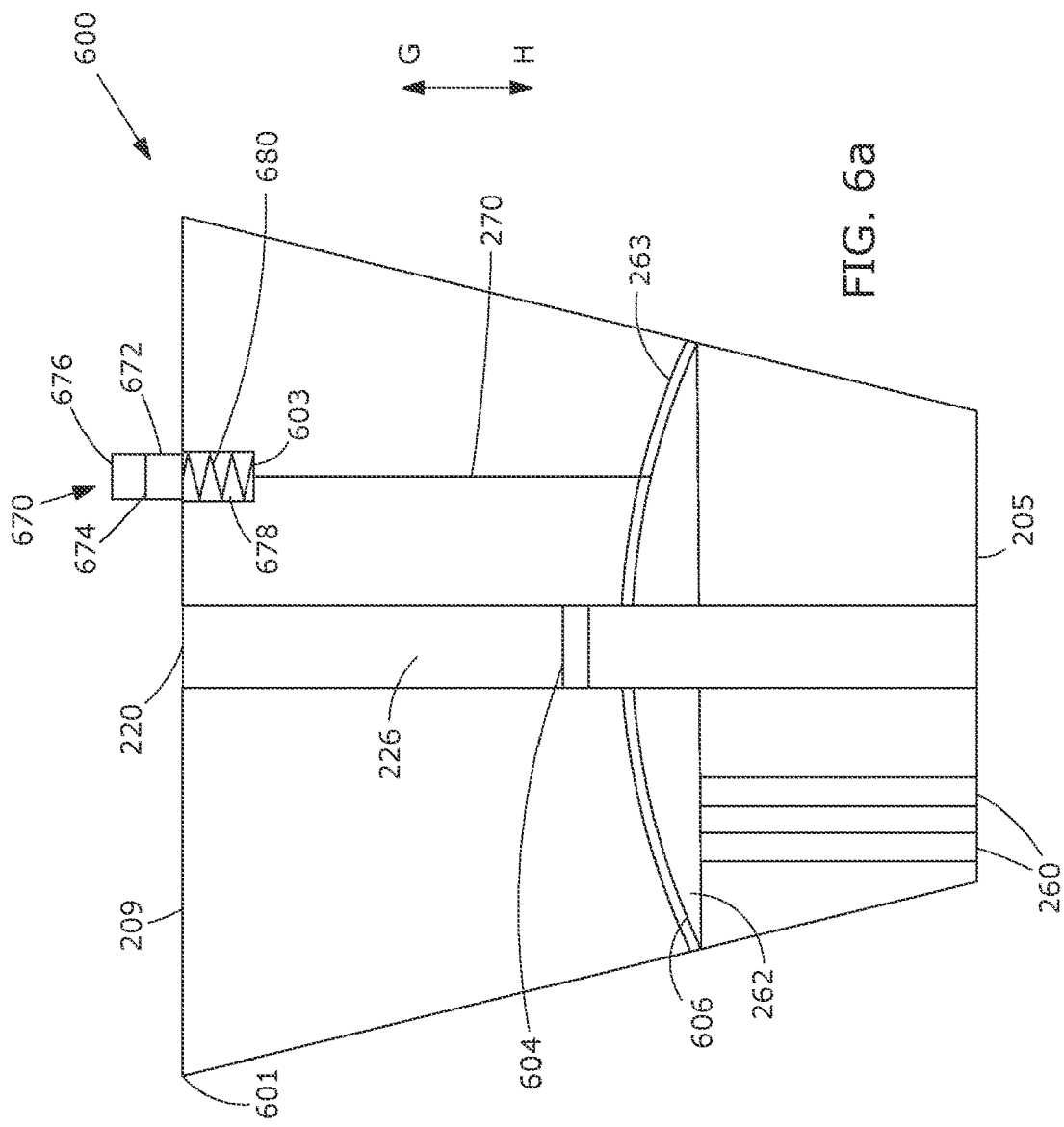
FIG. 6b
FIG. 6a

| Section | Value |
|---|---|
| Adequate Dose Indication Received | Y |
| Date stamp | 04-01-2017 |
| Time stamp | 12:00 |
| Item | Nap Val Cab 2015 |
| Date Opened | 04-01-2017 |
| Time Opened | 11:30 |
| Device ID | 93820 |

PRESERVATION METHOD

BACKGROUND

This application is a continuation of U.S. patent application Ser. No. 16/606,119, filed Oct. 17, 2019, which is a section 371 national stage of patent application PCT/US2018/028205, filed Apr. 18, 2018, each of which are hereby incorporated by reference. This application claims the benefit of U.S. patent application No. 62/487,428, filed Apr. 19, 2017.

FIELD OF THE INVENTION

The present invention relates to preservation systems and methods. Many food and beverages degrade in the presence of oxygen through a chemical process called oxidation. For example, oxygen reacts readily with the alcohol in wine to form acetic acid (in diluted form known as "vinegar"). The oxygen will further react with aromatic compounds found in wine. This degrades the flavors and aromas of the wine. For wine, this process can occur in a noticeable way in as little as 48 hours. Because wine is generally stored in larger containers, there is a significant amount of wine that spoils due to oxidation, the cost of which is estimated at 1.5 billion USD. This is not limited to wine, as other foods and beverages will undergo oxidation reactions as well and/or have bacteria growth in the presence of oxygen.

To reduce oxidation, food and beverages are generally hermetically sealed. However, after a package is opened, oxygen readily begins to react and reduce the quality of the product. For large packages or containers of food and beverages, this means there is a short time to consume the item. Should too much time pass, the item may spoil due to oxidation. This results in a further 40% of all food going to waste, as studied by the National Resource Defense Council. See *Wasted: How America Is Losing Up to* 40 *Percent of its Food from Farm to Fork to Landfill, NRDC. Org,* Gunders, Dana. 2012.

Attempts have been made to reduce oxidation using vacuums. For the preservation of wine, there has been many attempts to use manual vacuum pumps to pull the air, which comprises about 78% nitrogen and about 21% oxygen, mixture from the enclosed space. However, these vacuum systems are ineffective. Because of the force needed to manually pull a strong vacuum, vacuum systems generally leave at least half of the oxygen in the enclosed space.

U.S. Pat. No. 7,562,794 provides the device that is purported to reduce pressure by 0.2 bar. With the atmosphere being approximately 1.0 bar, this system therefore leaves 80% of the air in the enclosed container, and therefore 80% of the oxygen. Oxidation will readily occur even at low concentrations. Electronic, non-manual, vacuums have been used. These have similar ineffectiveness, and have added manufacturing expense.

US Patent Application Publication No. 2011/0204093 discloses a device that uses an inert gas to displace oxygen and to push the wine through tubing for dispensing. This device requires various housing, tubing, and expensive and bulky parts resulting in high cost and have limited mobility.

U.S. Pat. No. 7,712,637 discloses another preserve and dispense device. The device uses a needle to introduce inert gas into a bottle of wine through the cork and dispenses wine back through the needle. Preserve and dispense systems such as these requires many finely machined and expensive parts, expensive manufacturing, and are difficult to use successfully. Furthermore, the device of U.S. Pat. No. 7,712,637 relies on a "self-healing" cork for proper function. This removes the ability to use in food containers and in screw cap sealing wine and beverage containers.

The present inventor has recognized the need for a simple device for administering inert gas for preservation, while providing a device for metering the dose of such inert gas. The present inventor recognized the need for a method and device that will ensure an effective dose of inert gas is administered to avoid wine spoiling or significant overuse of the limited quantity of gas inside the small container.

Without a device or method to ensure a proper dose of inert gas is utilized, the present inventor recognized that inert gas can be underused and ineffective, or overused and waste the limited amount of inert gas they contain.

The present inventor recognized the need for a system and method of preserving wine and other oxygen sensitive items that is simple and effective to use. The present inventor recognized that a better system would give users a specific metered dose which is at least 0.15 g with inert gas and give the users indication of successful use.

SUMMARY

A method of preserving an oxygen sensitive item is disclosed. The method involves injecting at least 0.15 gram of an inert gas into a container comprising the oxygen sensitive item and oxygen, without raising a pressure within the container above 10 psig, to form a barrier layer of the inert gas between the oxygen sensitive item and the oxygen in the container without displacing all of the oxygen from the container.

Numerous other advantages and features of the present invention will become readily apparent from the following detailed description of the invention and the embodiments thereof, from the claims, and from the accompanying drawings.

BRIEF DESCRIPTION OF THE DRAWINGS

FIG. 1*f* is a side section view of an embodiment of a top portion of a container, capable of containing a pressurized inert gas, in a first stage of operation.

FIG. 1*g* is a side section view of the container of FIG. 1*f* in a second stage of operation.

FIG. 2*d* is a side view of the closure device of FIG. 2*a* deployed on the container of FIG. 1*c*.

FIG. 2*ei* is a table showing certain masses of argon administered for given circumstances.

FIG. 2*eii* is a table showing certain masses of argon administered for given circumstances.

FIG. 2*fi* is a side section view of a second embodiment closure device.

FIG. 2fii is a side section view of the closure device of FIG. 2fi in a first stage of operation.

FIG. 2fiii is a side section view of the closure device of FIG. 2fi in a second stage of operation.

FIG. 6a is a side section view of a sixth embodiment closure device.

FIG. 6b is a side view of a vacuum pump.

FIG. 7b is a circuit diagram for a circuit usable with the closure device of FIG. 7a.

FIG. 7e is an exemplary datastore record of an embodiment of the invention.

DETAILED DESCRIPTION OF THE EMBODIMENTS

The following description is presented to enable any person skilled in the art to make and use the invention. For the purposes of explanation, specific nomenclature used provides a plural understanding of the present invention. While this invention is susceptible of embodiment in many different forms, the drawings and this description demonstrate specific embodiments of the invention with the understanding that the present disclosure is to be considered as an exemplification of the principles of the invention and is not intended to limit the invention to the specific embodiments illustrated.

Figure 1A:
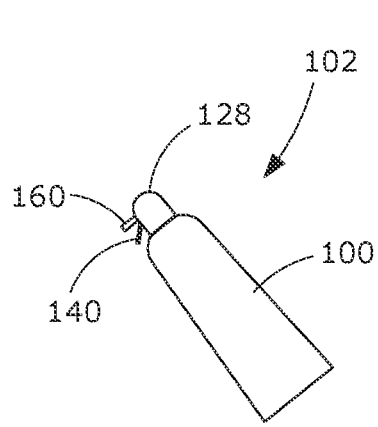
FIG. 1*a* is a side view of an embodiment of a container capable of containing a pressurized inert gas.
Figure 1B:
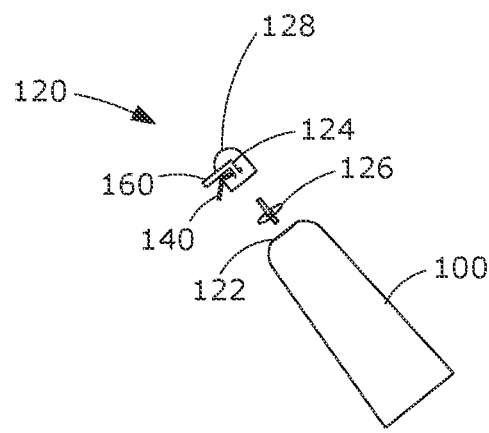
FIG. 1*b* is a side exploded view of the container of FIG. 1*a*.
Figure 1C:
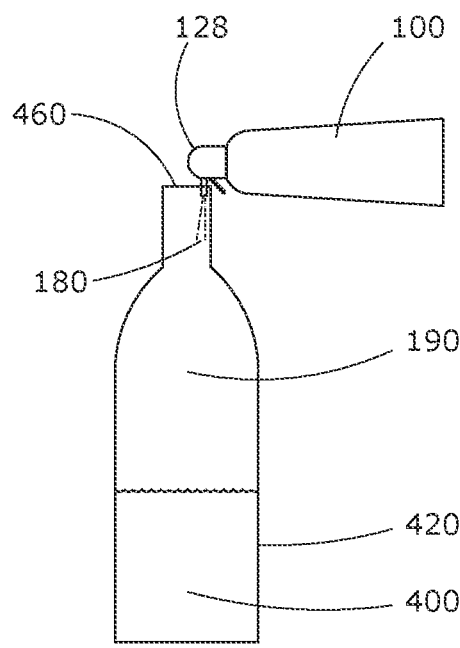
FIG. 1*c* is a side view of the container of FIG. 1*a* shown deployed on a container having oxygen sensitive contents.

FIGS. 1a through 1c shows a source of inert gas 102 comprising a source container or bottle 100. The contents of the bottle is pressurized. In some embodiments, the bottle 100 can safely hold above 60 psig of inert gas. In some embodiments, the bottle 100 is made of a recyclable material such as steel or aluminum, although other strong materials may be used. In some embodiments, the bottle 100 is a DOT 2Q certified aerosol container. While a bottle is shown, other sources of inert gas could be used in various embodiments.

The bottle 100 has an opening 122 that is filled or covered with a valve 120 that creates a hermetically sealed closure. In some embodiments, the valve comprises a valve member 126, a housing 128, a pathway 124, and an actuator 140. In some embodiments, the valve 120 is capable of actuation to release the contents of the bottle 100 at a rate of between 0.05 gram (g) to 1.00 g per second. The valve member 126 is in contact or in operable connection with the actuator 140 such that moving the actuator 140 from a rest position to an engaged position will open the valve member 126 and open the pathway 124 to a nozzle 160. In some embodiments, moving the actuator downward moves the valve member 126 down to open the pathway in communication with the bottle 100 interior. In some embodiments, the housing 128, lever actuator 140, and the nozzle 160 are constructed in one piece, although other arrangements may be provided. The housing 128, actuator 140 and nozzle 160 may be formed or molded of or comprise plastic.

FIGS. 1f and 1g shows details of one embodiment of valve 120 for the bottle 100, but the housing 128 is not shown. The valve member comprises an upper opening 125 and a passage way 133 to the pathway 124. A spring stop 129 is attached to a support 131. A valve spring 127 is bounded at a bottom end by the spring stop 129 and at a top end by the valve member 126. The spring 127 biases the valve member 126 to a closed position shown in FIG. 1g. In the closed position, the upper opening 125 of the valve is closed against a top wall 101 of the bottle. Therefore, the contents of the bottle does not have an open path to the pathway 124 out of the container. To open the valve, the actuator 140 is pushed down in the direction L of FIG. 1f. This releases the valve member 126 from contact with the upper wall 101 and opens the upper opening 125 and therefore opens communication between the interior of the bottle and the passage way 133. Moving the actuator 140 down causes the valve member 126 to compress the spring 127 between the valve member 126 and the stop 129. When opening 125 is open the contents of the bottle may flow through the passage way 133 and the pathway 124 and out the nozzle 160. When the actuator 140 is released the spring 127 will drive the valve member 126 to a closed position in the direction K of figure 1f where opening 125 is closed as shown in FIG. 1g. While one type of valve is shown in figures 1f and 1g, other valves can be used.

Figure 2A:
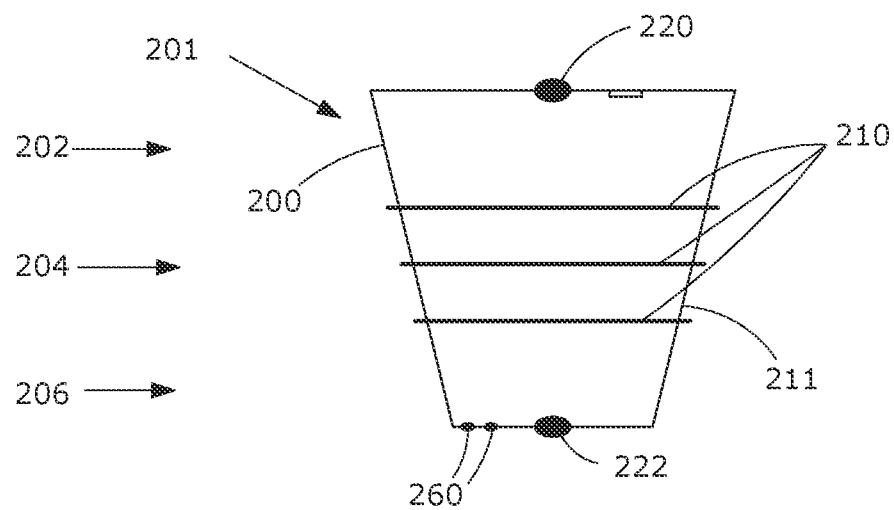
FIG. 2*a* is a side view of a closure device of an embodiment of the invention.
Figure 2C:
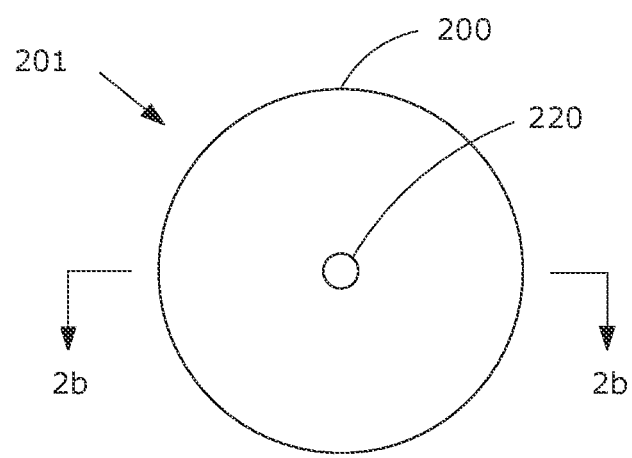
FIG. 2*c* is a top view of the closure device of FIG. 2*a*.
Figure 2B:
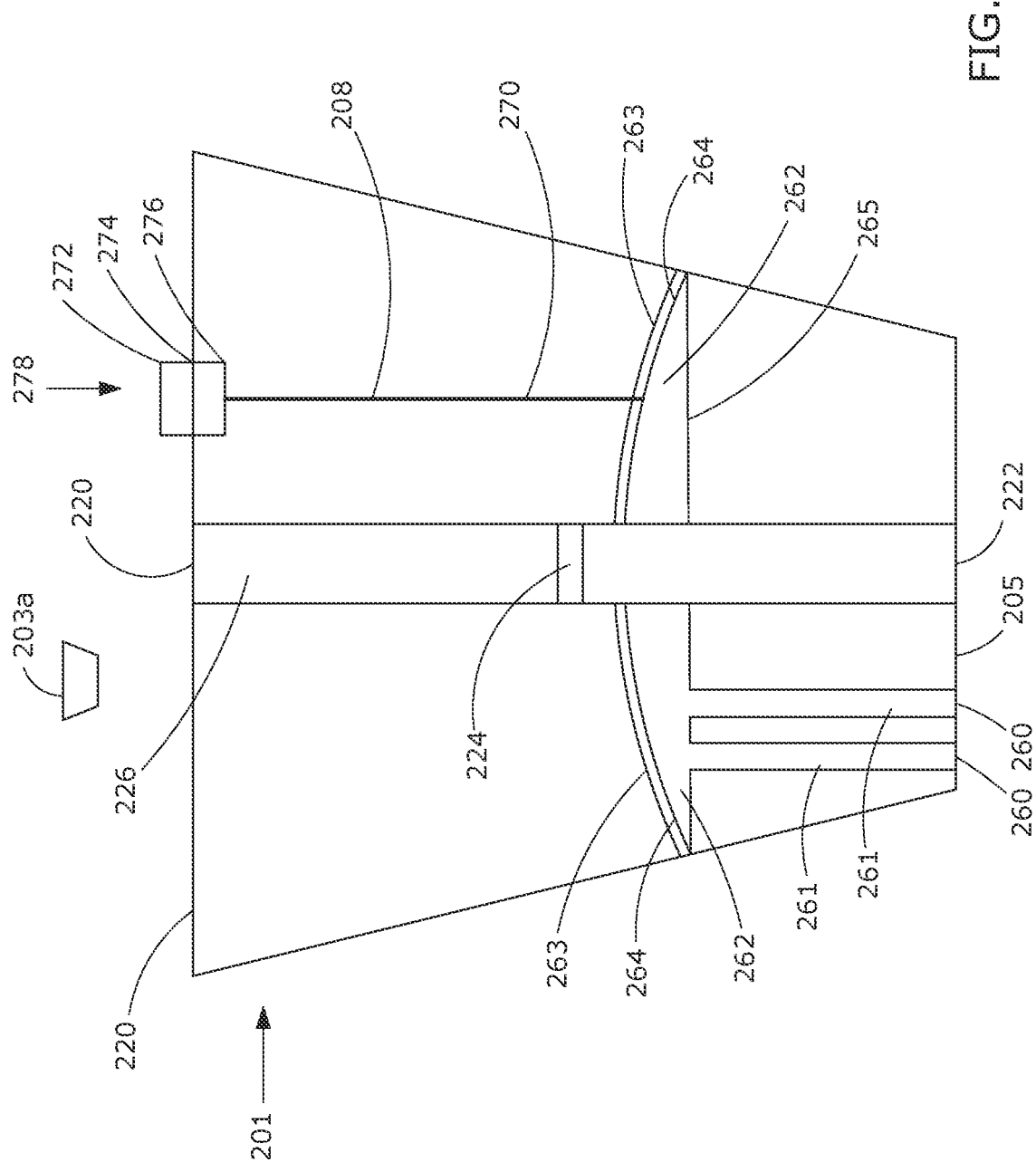
FIG. 2*b* is a side sectional view of the closure device of FIG. 2*a* taken along line 2*b*-2*b* of FIG. 2*c*.

FIGS. 2a, 2b, and 2c illustrate one embodiment of a closure device 201 that may be used in conjunction with the inert gas source and dispenser of FIGS. 1a, 1b, and 1c. In some embodiments, the closure device 201 has all or some of the internal parts contained within a housing 200. In some embodiments, the housing 200 is or comprises a plastic molded material such as Polytetrafluoroethylene (PTFE) or Polyethylene terephthalate (PET), though other hermetic materials may be used. The housing 200 is shown in FIGS. 2a, 2b, and 2c as a tapered cylinder, or a truncated cone, designed to close a top opening of a typical bottle, though other geometries are acceptable to fit in other container types. The housing 200 has an upper section 202 designed to reside on the exterior of an enclosed container 420, a lower section 206 designed to reside within the 420 container, and a middle section 204 designed to be between the upper and lower section and reside partially or fully within a container opening 460.

On the exterior of the housing 200 may be one or more seals 210, which may be annular hermetic seals. The purpose of the 210 seals is to prevent gas leak into or out of a 400 container about the perimeter of the housing.

The seals 210 may extend beyond the perimeter wall 212 of the housing. The seals 210 may be attached to the perimeter wall 212 to the housing 200 or may be integrally formed with the wall 212. Although shown in this embodiment of device 201, other embodiments may omit some or all of the seals 210, particularly where they may not be necessary for certain closure types. In some embodiments, the seals 210 are formed of or comprise PTFE, ethylene propylene diene monomer rubber (EPDM), natural cork and/or other materials utilized in O-ring applications to ensure proper hermetic seal. In some embodiments, the closure 201 is solid, with the exception of certain internal parts described below, though other embodiments with more hollow spaces or interior components are possible.

The housing 200 comprises within it the following hollow spaces: an inlet channel 226, a pressure sensor chamber 262, and an indicator channel 208.

The upper section 202 of housing 200 comprises an external inlet port 220. The lower section 206 of the housing comprises an internal inlet port 222. The inlet channel 226 is a hollow section between the two ports 220, 222. The ports 220, 222 may have different sizes and geometries, but the external inlet port 220 is preferably sized to receive the nozzle 160 tightly and create a hermetic seal at the nozzle.

The inlet channel 226 may comprise a one-way valve 224 that allows flow from the external inlet port 220 to the internal inlet port 222 (from outside to inside). In some embodiments, the one-way valve 224 is a swing type check valve that is made of PTFE or other plastic molded material and hinged onto a surface of the inlet channel 226. However, other check valve designs and material that allows one directional flow into the enclosed container with hermetic sealing against back-flow could be used. In some embodiments, a plug 203a is inserted into the inlet port 220 after dispensing the correct dose of inert gas 180 to seal or further hermetically seal the channel closed.

The housing 200 comprises the hollow pressure sensor chamber 262. A bottom surface 205 of the lower section 206 of the housing 200 has one or more internal pressure sensor ports 260. The internal pressure sensor ports 260 allow the atmosphere of the container 420 to reach a pressure sensor chamber 262. The ports are in communication with the sensor chamber 262 through channels 261. The pressure sensor ports 260 and the chamber 262 may vary in geometry. In some embodiments, the chamber 262 comprises a circular geometry in cross-section in a plane parallel to the bottom surface 205 is provided for ease of manufacturing and minimizing the hollow space to less than 1 milliliter (mL) of total volume.

The chamber 262 comprises a top wall 263, a lower wall 265, and a pressure sensing element 264, such as a diaphragm. In some embodiments, the diaphragm is made of PTFE or another flexible material.

The thickness and flexibility of the material may be chosen or configured to make the pressure sensing element 264 calibrated to a predefined pressure within the container 420 that results in adequate inerting. For example, the material could be a thickness such that is moves upward 2 mm in a linear fashion when pushed by a predefined pressure from the container 420 that is being filled with an inert gas.

The pressure sensing element 264 is attached to an indicating cam 270. The cam 270 operates within an indicator channel 208. In some embodiments, the cam 270 is loosely fit within an indicator channel 208. The cam 270 is connected to the underside of an indicator 278. In some embodiments, the indicator comprises two or more visual sections. These visual sections can be arranged such that an adequate dose (high pressure) section 276 is marked below a transition area indication section 274, which is below a low dose (low pressure) indication section 272. The length of each section is calibrated with the pressor sensor similarly to the pressure sensing element 264. For example, if 2 mm of movement from the pressure sensing element 264 corresponds to an adequate dose, the low dose indication section 272 could be 1.0 mm in length vertically, and the transition area indication section 274 could be 1.0 mm in length vertically. The arrangement of the sections is such that at rest externally only the low dose section 272 is visible with the other two sections hidden within the housing 200. Therefore, the pressure sensing element 264 drives the cam 270 to cause the indicator section 278 to extend or pop-up a predetermined distance in the direction A, of FIG. 2b, depending on the pressure applied to the pressure sensing element 264. When not under pressure, the cam 270 and indicator section 278 will fall back in the direction B to a home position.

In some embodiments, the material of the cam 270 and indicating section 278 is a hard plastic such as PET and the geometry of the cam and indicating section 278 is straight and cylindrical in cross-section. However, in some embodiments, the material and geometry of the indicating cam 270 and indication section 278 can be any stiff material or any shape that allows visual markings. The wall(s) of the indicator channel 208 can be of any stiff plastic or other materials such as PTFE or PET or natural cork, so long as the material that provides a sealing contact with the container can maintain hermetical seal therewith. Further if the wall(s) of the indicator channel 208 are in contact with the cam 270 then the wall(s) should be of a material that does not cause significant friction for the cam 270.

A method of preserving an oxygen sensitive item is disclosed involving the application of an inert gas, such as argon. The dose of argon administered to a container should be at least 0.15 grams of argon. It was found that at less than 0.15 gram of argon, the argon does not achieve a sufficient concentration within the bottle to form a layer, such as the layer of inert gas 180 of FIG. 1d, to protect the wine and form a barrier between the wine and the oxygen in the bottle.

Figure 1D:
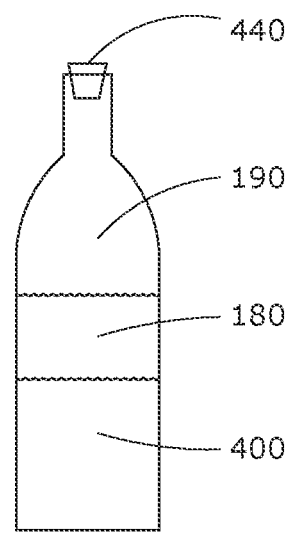
FIG. 1*d* is a side view of the container having oxygen sensitive contents of FIG. 1*c*.

FIGS. 1c and 1d show a container 420, which may be a traditional 750 to 1500 mL bottle. If the item 400 in the bottle is wine and the inert gas 180 is argon, such as shown in FIG. 1d, in some embodiments, the dose administered may be calibrated at 0.15 g to 0.50 g for effective preservation. In some embodiments, to ensure proper dose of inert gas, the pressor sensing element 264 is calibrated to push the adequate dose indication 276 visible at between 6 psig (pounds per square inch gauge) and 10.0 psig, inclusive. In some embodiments, the pressor sensing element 264 is calibrated to push the adequate dose indication 276 visible at 8.0 psig.

The pressure that achieves a given dose weight of argon can be calculated using the ideal gas law. The ideal gas law is PV=nRT. P is the pressure of the gas, V is the volume of the gas, n is the amount of substance of gas (in moles), R is the ideal, or universal, gas constant, equal to the product of the Boltzmann constant and the Avogadro constant, and T is the absolute temperature of the gas.

Pressure in the bottle is function of both the amount of wine contained in the bottle (therefore indicating the free headspace in the bottle) and the amount of argon injected in to the bottle, thus, Pressure=p(headspace_volume, argon_dispensed_mass).

Therefore the following equation can be used to calculate the mass of the argon inserted into a bottle for a given pressure, Mass=n * MM. As explained in the ideal gas law, n is the amount of substance of gas (in moles), in this case the mount of argon. MM is the molar mass of pure argon. Using the ideal gas law n=P * V/R/T. Therefore, Mass=PV/

R/T * MM. Filling in the ideal gas law values for this application results in: PV/R/T * MM=Psetpiont * Vheadspace/R/T * MM. Psetpoint is the predefined target pressure, in atmospheres (atms), at which the device is set to provide an indication to the user. Vheadspace is the volume of the headspace in the container above and not occupied by the wine in the bottle. For example, when the 8 psig or 0.204 atms is the Psetpoint and 25% of the wine in the 750 mL wine bottle is consumed, leaving 0.1875 L Vheadspace, the mass of argon added to the bottle is calculated by (0.204 atm) * (0.1875 L)/(0.820 L * atm/mol/K)/294 K * 39.94 g.mol. This provides a mass of 0.17 g of argon.

FIGS. 2ei and 2eii show a tables that apply the above formula to show the calculated mass of argon applied to a 750 ml bottle for a given application pressure and a given amount of wine used and therefore free headspace. FIG. 2ei shows values when argon was added until 8.0 psig pressure was reached in a 750 ml bottle. For example, FIG. 2ei shows that when argon was added until 8.0 psig pressure was reached in a 750 ml wine bottle containing 75% wine and 25% free head space, 0.17 g of argon was added to the bottle. When argon was added until 8.0 psig was reached in a 750 ml wine bottle containing 25% wine and 75% free head space, 0.51 g of argon was added to the bottle.

However, if a pressure lower than 6 or 8 psig is desired, then a lower pressure can be used with multiple doses. An example lower pressure per dose of 3 psig is shown in FIG. 2eii.

FIG. 2eii shows values when argon was added until 3 psig pressure was reached in a 750 ml bottle. For example, the table of FIG. 2eii shows that when argon is added until 3 psig pressure is reached in a 750 ml wine bottle containing 75% wine and 25% free head space, 0.06 g of argon was added to the bottle. In order to reach a preferred at least 0.15 grams of argon, three doses of argon to 3 psig would be needed, which would yield 0.18 g of argon after the third dose. Similarly, when argon is added until 3 psig pressure is reached in a 750 ml wine bottle containing 50% wine and 50% free head space, 0.13g of argon was added to the bottle. Therefore two doses of argon to 3 psig would be need to reach the target of at least 0.15 grams of argon. The two doses would result in a total of 0.26 gram of argon administered.

Therefore, multiple doses or applications of argon at a lower pressure can achieve at least the desired 0.15 gram of argon. Lower pressures may be desirable to reduce the chance of the closure device dislodging from the bottle at higher pressures or requiring a protective restraint for safety. A protective restraint may additionally be utilized to affix the closure device 201 to the enclosed container 420 such a wire cage typically found on sparkling wine or champagne bottle tops to hold in the cork. Therefore, methods of use include calibrating the pressure sensing element 264 at lower setpoint, such as 2.0 or 3.0 psig, and having the user spray or dose the argon until the indication is provided a set number of times to meet the 0.15 to 0.50 g dose for preservation.

Prior to operation of the closure device, there is air (oxygen and nitrogen mixture) 190 within the enclosed container 420. There is also shown a general hermetical closure 440, such as a bottle cork, which can be optionally used as a reduced form to eliminate the parts labeled as 200 to 299. This reduced form of the device might be used when the item 400 has a valve and/or container 420 that is not economical to create a specific metering close for. An example of this could be for preserving spices, depending on the container.

A manner of operating the device 201 and/or valve 120 is disclosed. The device 201 may be held by a person that desires to preserve an opened container 420 that has an oxygen sensitive item 400, such as food or liquid. The closure device 201 may be placed into an opening 460 on the container 420. The closure device 201 should be placed on or in the container such that a hermetic seal between the outside atmosphere and inside the container 420 is created.

The user then seats the nozzle 160 into the inlet port 220. This creates a hermetic seal. The user then squeezes the lever actuator 140 to administer inert gas 180. Pulling the actuator 140 opens the valve 120 which then allows inert gas 180 to flow from the bottle 100 into the container 420.

While the ergonomic lever actuator 140 is pulled: the inert gas 180 travels from the pressurized bottle 100, through the open valve 120, through the passage 124, and is redirected through the nozzle 160 into the inlet channel 226, past the one-way valve 224, and into the container 420. The pressure of the inert gas 180 should be sufficient to push open the one-way valve 224 and into the container 420. The inert gas 180 is then trapped into the container and raises the pressure of the container 420 above the ambient pressure. Although other flow rates can be utilized, in one embodiment the valve 120 allows between 0.15 g and 0.50 g of inert gas 180 per second.

As the inert gas 180 is filling the container 420 and the pressure raises, the pressure sensing element 264 begins to rise. The pressure in the container 420 is registered through the ports 260 into the chamber 262 and is received against the pressure sensing element 264. As the pressure sensing element 264 rises, it pushes an indicating cam 270 vertically. The cam 270 then pushes visual indicators outside the housing 200. These visual indicators 272, 274, 276 are calibrated such that when pressure reaches a designated pressure the corresponding visual indicators raise above the housing to be visible.

The visual indicators allow the user to know when the effective inert gas 180 has been administered. The user will then release the lever actuator 140, and removes the nozzle 160 from the closure device 201. The pressure from within the container 420 pushes the one-way valve 224 shut and hermetically seals the system. Thus, the user has economically administered an inert gas 180 to the oxygen sensitive item 400. Although other reasonable timeframes are acceptable, in some embodiments, the process is envisioned to take one to two seconds.

If the item 400 is wine within a traditional 750 to 1500 mL bottle and the inert gas 180 is argon, the dose administered may be calibrated at 0.15 g to 0.50 g for preservation. To ensure proper dose, the pressor sensing element 264 is calibrated to push the adequate dose indication 276 at between 6.0 psig and 10.0 psig, with typical operation at 8.0 psig. Alternatively, as explained above, the setpoint may be at a lower setpoint, such as 2.0 or 3.0 psig, and the user may be instructed to watch for the indication a set number of times, such as 3 to 4 times.

An additional embodiment is illustrated in FIGS. 1c and 1d. In this embodiment, the closure device 201 is not utilized. This embodiment may be used for an item 400 that does not warrant its own closure device 201 with housing 200 that fits into its container opening 460. The operation and method is the same as described for device 201 except that the dose of inert gas 180 is not metered and a general hermetical closure device 440, such as a wine bottle cork, is utilized. The nozzle 160 is placed directly in the container opening 460. After the inert gas is applied into the container for a predetermined amount of time, the nozzle 160 is removed and the closure device 440 is used to hermetically close the container 420.

Other alternative closure methods include having a plug 203a as an alternative to a one-way inlet valve 224 for device 201. The nozzle 160 could enter the closure device 201 directly to inject the dose of inert gas 180 necessary, and then after a period of time be removed and a plug inserted into the opening 220 of the channel 226 to maintain of hermetic seal. This would lower the pressure inside the container 420, and as such a heavy gas such as argon might be necessary for effective preservation.

Examples of containers 420 include, but are not limited to, wine bottles, spice containers, guacamole containers, rum, brandy, or other alcohol containers. Likewise, the liquid or food items that might be contained in the container 420 include but are not limited to wine, rum brandy, other alcohol, spices, guacamole, etc.

Figure 1E:
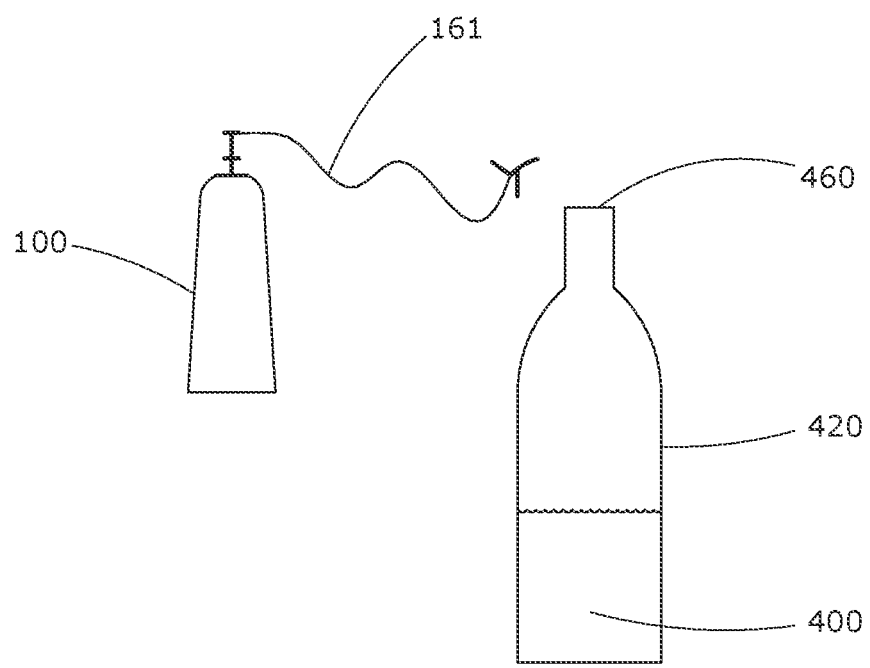
FIG. 1*e* is a side view of an alternative embodiment container 100 with a remote valve.

Although the housing 128 and the valve 120 are joined to or closely adjacent to the container 100 in FIGS. 1a, 1b, and 1c, it is possible for the container 100 to be separated and remote from the valve 120 and housing 128. Then the container 100 may be connected to the housing 128 and valve 120 by a tube 161 or other conduit, as shown in FIG. 1e. In some embodiments, the container 100 is an aerosol type container. In some embodiments, the container 100 comprises a dispensing mechanism, such as a manual or electric pump.

Although the closure device 201 provides a visual indication section 278, it is possible for indication to be an audible indication in addition to or in the alternative to the visual indication. FIGS. 2fi, 2fii, and 2fiii show a second embodiment closure device 203 having an audible indication.

The device 203 is the same as device 201 except as shown as described. In some embodiments, the device 203 does not have an indication cam 270, low dose indication section 272, transition indication section 274, or adequate dose visual indication section 276. Also, the pressure sensing element 264 and indication cam 270 are replaced by an elastic device, such as a springs 286, 266.

The pressure sensing element 264 is attached to a rod 288 that moves vertically through the pressure chamber 262 and its top wall 263. The rod 288 is contained at one end in a return spring base 296. The rod is rigid and may be made of a plastic such as PTFE or PET or other suitable material. The rod 288 is long enough that it will stay housed in the spring base 296 when there is no pressure pushing the diaphragm 264 upwards, but short enough that it will not stop the diaphragm's 264 motion upward when there is pressure acting upon the diaphragm 264.

Attached to the rod 288 is a 289 rod spring barb. The barb 289 may be crafted as part of the rod 288 or adhered strongly to the rod 288. The barb 289 extends transverse from the rod. In some embodiments, the barb is perpendicular to the rod. The purpose of this barb 289 is to engage and hold a return spring 268. The return spring 268 pushes the rod 288 downward by acting upon the return spring barb 289 and a return spring base 296. The return spring base 296 comprises stop element 296b, which may be circular. The stop element holds the return spring 268 in place. The return spring base also comprises a hollow section 296a that allows the rod 288 to freely move vertically therein.

The purpose of this downward force by the return spring 268 is to ensure that, without pressure acting against the pressure sensing element 264, the rod 288 will rest at its lowest position.

The return spring 268 is sized such that its force under tension is greater than that of a resistance spring's 266 force under tension. The resistance spring's 266 force is sized such that when released from tension at a fast rate, it will cause an audible sound to be created when a cam actuation rod 282 hits a strike location.

Furthermore, the return spring's 268 force is less than the combination of the resistant spring's 266 force under tension and the force of the diaphragm 264 due to pressure, when a predefined indicating pressure inside the enclosed container 420 has been reached. Both the return spring's 268 force and the resistant spring's 266 force under tension is lower than the force exerted by the diaphragm 264 due to pressure inside the container 420, when the predefined indicating pressure inside the container 420 has been reached.

Between a first and a second end of the rod 288 is a cam follower 280. In some embodiments, the cam follower 280 is attached to a middle of the rod between the first and second ends at an attachment location 293. In some embodiments, the cam follower 280 is a round but non-perfect circle cam follower. This cam follower 280 rotates around a cam rotation center support or hub 290. The cam follower 280 is attached to the rod 288 such that when the rod 288 moves upwards, in the direction C, and downwards, in the direction D, the cam follower 280 rotates about the hub 290.

The cam follower 280 comprises a peninsula 281 on a side of the cam follower opposite of the attachment location 293. Counter clockwise from the peninsula 281 is a first strike location 285. A first valley 287 is located between the first strike location 285 and the peninsula 281. Clockwise from the peninsula 281 is a home valley 286. Clockwise from the home valley is a second strike location 283.

On a side of the cam follower 280 opposite of the attachment location 293 is a resistance spring base 269, a resistance spring 266, and an actuation rod 282. A first side of the spring is in contact with a contact face 271 of the base 296. In some embodiments, the contact face is circular. The rod 282 has a striker end 273. Opposite the striker end 273 is an actuation rod barb 267. The barb 267 holds a second end of the spring 266. The barb 267 can be adhered to the actuation rod 282 or molded as one piece with the actuation rod 282.

The rod 282 can extend into and move in a hollow space 275. The spring 266, secured against the base 296, biases the rod 282 in the direction E and toward and in contact with the cam follower 280. In some embodiments, the striker end 273 comprises a roller. In some embodiments, the striker end comprises a non-rolling smooth surface.

FIG. 2fii shows the pressure sensing element 264 in a lowered, home position and the striker end of the actuation rod in a home location in the home valley 286.

When pressure increases in the chamber 262, the pressure causes the pressure sensing element 264 to rise. The sensing element 264 rises against the combined force of the return spring 268 and the resistance spring 266. As the pressure sensing element 264 rises, the rod 288 rises in the direction C of FIG. 2fii. The rod 288 rising causes the cam follower 280 to rotate in the clockwise direction due to the attachment of the rod 288 to the cam follower 280 at the attachment location 293. The clockwise rotation of the cam follower causes a clockwise movement of the peninsula 281. The clockwise movement of the peninsula 281 causes the striker end 273 of the rod 282 to move along the first incline wall 284 of the peninsula 281. This movement pushes the rod 282 back in the direction F of FIG. 2fii. The backward movement of the rod causes the barb 289 to compress the spring 266 against the base 269. This compression increases the elastic potential energy stored in the spring.

As the peninsula continues to rotate in the clockwise direction with the cam follower, the striker end of the rod will eventually reach a peak 291 of the peninsula 281. When the striker end passes the peak 291 during rotation, the striker end will be freed from continuous contact with the cam follower. It will lose contact with the peninsula. The stored elastic potential energy in the spring caused by the compression at the peninsula will be released and will drive the striker end and the rod in the direction E and into contact with the first strike location 285 of the cam follower as shown in FIG. 2*fiii*. The striking contact of the striker and with the first strike location will create an audible sound. This audible sound will indicate to the user that a predefined pressure has been reached and therefore a predefined amount of inert gas has been added to the corresponding container.

When the striker end is released from the peninsula, the clockwise torque caused by the chain forces originating from the pressure inside the chamber 262 and the torque caused by the resistance spring 266 is in the same direction, accelerating the angular rotation of the cam follower 280 clockwise. This change in angular velocity causes the cam follower actuation rod 282 to hit location 285 and creates an audible noise. Therefore not only does the spring 266 driving the striker end to contact the strike location contribute to the audible sound, but also the continued clockwise rotation of the cam follower contributes to the audible sound. The striker end 273 is driven toward the strike location 285 by the spring 266 and the strike location 285 is driven toward the striker end 273 by the pressure in the chamber 262.

The cam follower 280 and springs 268 and 266 can be configured so that the striker end will release from the peninsula when a predefined pressure is reached in the chamber 262. In some embodiments, the predefined pressure is 8 psig or as otherwise described herein.

As the rod 288 is driven upward the barb 289 compresses the spring 268 against the base 296 causing an increase in the elastic potential energy stored in the spring 268. When pressure in the chamber 262 is reduced, the return spring 268, and the potential energy stored therein, will drive the barb 289 and the attached rod 288 downward, in the direction D. In some embodiments, the return process begins when the pressure inside the chamber 262 lowers back to near 8 psig. The resistance spring 266 is sized such that its force is less than that of the return spring 268. The downward movement of the rod 288 will cause the cam follower to rotate in a counter-clockwise direction. The counter-clockwise movement of the peninsula will draw striker end along at least a portion of the second incline wall 295. It will move the rod 282 backward in the direction F, causing the spring 266 to be compressed. After the striker end 273 passes the peak 291 it will follow along the first incline wall 284 to the home valley 286, while the rod 282 extends under pressure in the direction E by the spring 266.

The home valley 286 and the strike location 285 may be the same material as the cam follower 280, such as plastics like PTFE, PET, or other suitable rigid materials, or one or both may be of a separate material that gives a stronger audible noise when struck, such as metal. At rest, when no pressure is acting against the diaphragm 264, the striker end of the rod sits pressed against the home valley 286 as biased to that location by the return spring 268.

The device 203 described provides one method in which a cam follower and springs can be utilized to make an audible sound. However, other methods of translating the force of pressure from the diaphragm 264 into an energy sink that will then suddenly release the stored energy such that motion causes two materials to strike and create an audible noise could also be used.

Figure 2G:
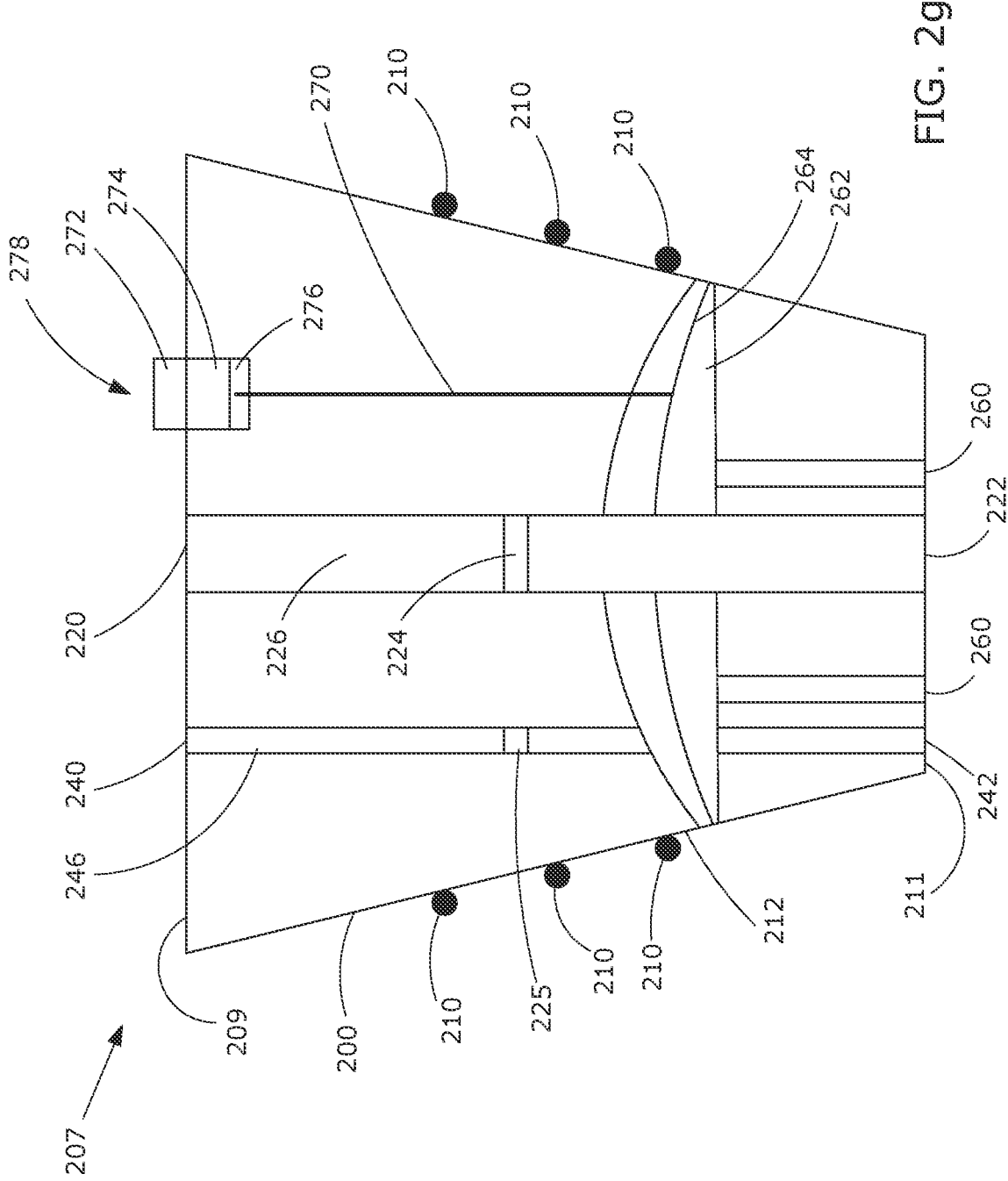
FIG. 2g is a side section view of a third embodiment closure device.

A third embodiment closure device 207 is illustrated in FIG. 2*g*. This embodiment includes the addition of an exhaust channel 246 as compared to the closure device 201. The device 207 is the same as device 201 except as shown as described.

The exhaust channel 246 extends from an upper aperture 240 in the upper surface 209 through the housing 200 to a lower aperture 242 in the lower wall 211. The exhaust valve 225 may be a one-way valve that allows flow from the inside of the container 420 to the external, in the direction C of FIG. 2*g*, but not in the reverse direction. The exhaust channel is not in communication with the chamber 262.

In some embodiments, the valve 225 is constructed such that its opening is delayed. In this way, the inert gas 180 might settle in the container 420 before the valve 225 is open to prevent or reduce the likelihood that the inert gas 180 will exit through channel 246. In some embodiments, the delayed valve opening is achieved by a pilot chamber or a spring mechanism.

Figure 2H:
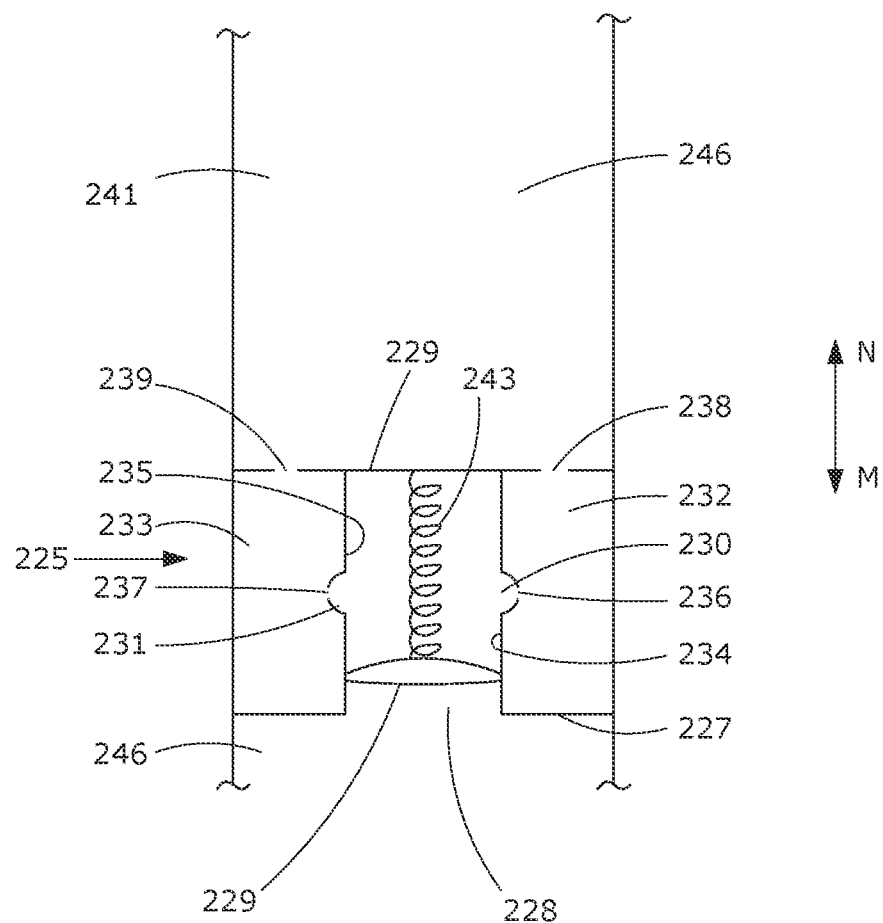
FIG. 2h is a side section view of a portion of an exhaust channel and an exhaust valve of the closure device of FIG. 2g.

FIG. 2*h* shows details of an example exhaust valve 225. The valve 225 comprises a housing 227, a first channel 228, a base 229, and a disk or piston 229. The housing 227 forms or comprises the channel 228. The side wall of the channel 234, 235 comprise recesses 230, 231. The recesses 230, 231 compress openings 236, 237 providing communication to a second chamber 232, 233. The second chamber 232, 233 comprises one or more outlets 238, 239 in communication with an upper side 241 of the exhaust channel 246. In some embodiments, the recesses 230, 231 are one annular recess or grove that extends about the cylindrical first channel 228, and the annular opening within the annular recess or grove extends completely about or interrupted in segments about the channel 228.

A spring 243 is supported against the base 229 of the housing 227. The spring biases the piston 229 downward is the direction M of FIG. 2*h*. Rising pressure within the adjoined container, such as container 420, will raise the pressure in the exhaust channel on the bottom side of the valve 225. This will cause the piston and spring to move upward in the direction N of FIG. 2*h*. When the piston reaches the recess 230, 231 and moves at least partially past the recesses so that a path way below the piston exists to the opening 236, 237, then gas, including oxygen, can pass the piston, travel thought the opening 236, 237, into the second chamber 232, 233, out of the second chamber through holes 238, 239, out the exhaust channel 246, and out the upper aperture 240. The spring 243 can be chosen or configured to allow a predetermined amount of pressure to build within the adjoined container 420 and exhaust channel on the lower side of the valve 225 before the valve opens by the piston at least partially passing or reaching the recess 230, 231. While FIG. 2*h* shows one type of one-way valve, other one-way valves could be used.

Figure 3A:
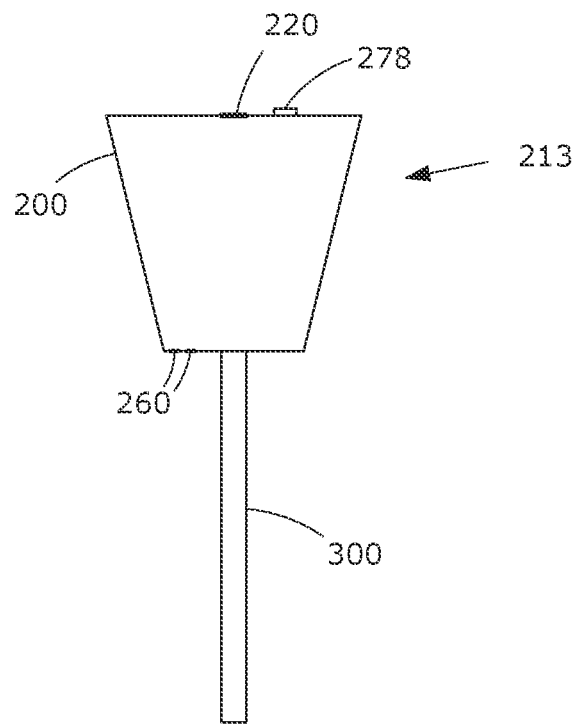
FIG. 3a is a side view of a fourth embodiment closure device.
Figure 3B:
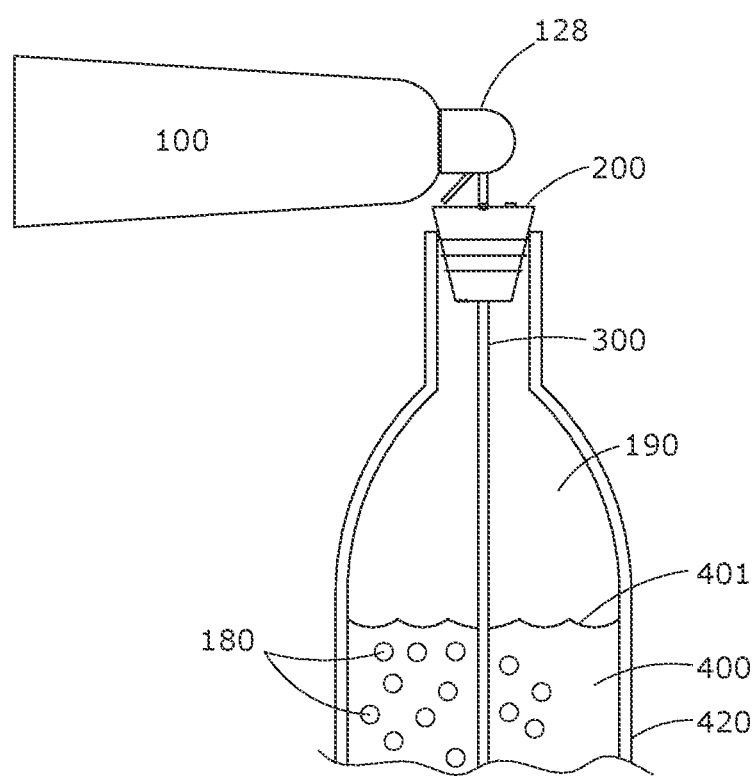
FIG. 3b is a side view of the closure device of FIG. 3a deployed on the container of FIG. 1c.

A fourth embodiment closure device 213 is illustrated in FIGS. 3*a* and 3*b*. The device 213 is the same as device 201, except that device 213 includes a sparging tube 300 that allows inert gas 180 to sparge the item prone to oxidation 400 if the item is a liquid (such as wine). The tube 300 is attached to the closure housing 200 at the inlet port 222. In some embodiments, the tube 300 is configured to extend to terminate adjacent a bottom of the intended container 420.

In some embodiments, the tube extends to terminate at least below the height of the expected upper surface 401 of the liquid in the container 420

When inert gas 180 is sprayed into the inlet port 220, it travels through the housing 200 and into the tube 300. This tube terminates beneath the liquid level of the item prone to oxidation 400.

Figure 4A:
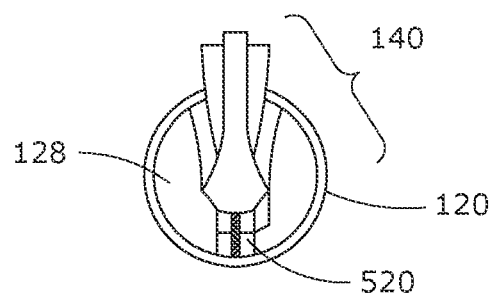
FIG. 4a is a top view of an inlet valve of FIG. 1b with a resistance spring.
Figure 4B:
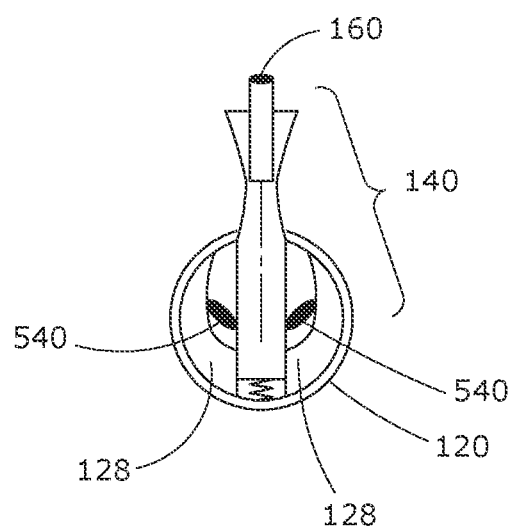
FIG. 4b is a top view of the inlet valve of FIG. 1b with a friction material.

In some embodiments, tube 300 is detachable from the housing 200 for ease of cleaning. The tube can be deployed on any embodiment of the closure device, such as closure devices 201, 203, 207, 215. Other embodiments are illustrated in FIGS. 4a, and 4b. These embodiments have a manner of metering a specific dose of inert gas 180 via one or more components that slow down the closing of the valve 120.

In FIG. 4a, a valve close resistance spring 520 is used to slow down the closing of the valve inlet 500. This resistance spring 520 pushes against the return bias of the actuator 140. The bias of the actuator 140 is sufficient to overcome the spring 520, but the spring's bias 520 slows down the closing return of the actuator 140 and valve 120. The spring 520 is attached to the actuator 140 such that it is between the actuator's 140 housing 128 and the nozzle 160. The spring 520 pushes against the actuator 140 at rest.

FIG. 4b shows an alternative embodiment which uses friction to slow down the closing of the valve inlet 506. A friction material 540, such as silicone, is used to resist motion of the actuator 140. The amount of friction is determined by the thickness, and therefore elastic force, of the friction material 540. The friction material 540 may be attached to the actuator 140, or within the stem 508. The friction material 540 is located between the housing 128 and the nozzle 160 or the tube pathway 124 to slow down the closing return of the actuator 140 and the valve 120. Friction material may be placed between the housing and the nozzle or the tube pathway 124 one or more than one side of the nozzle or the tube pathway 124.

Figure 5A:
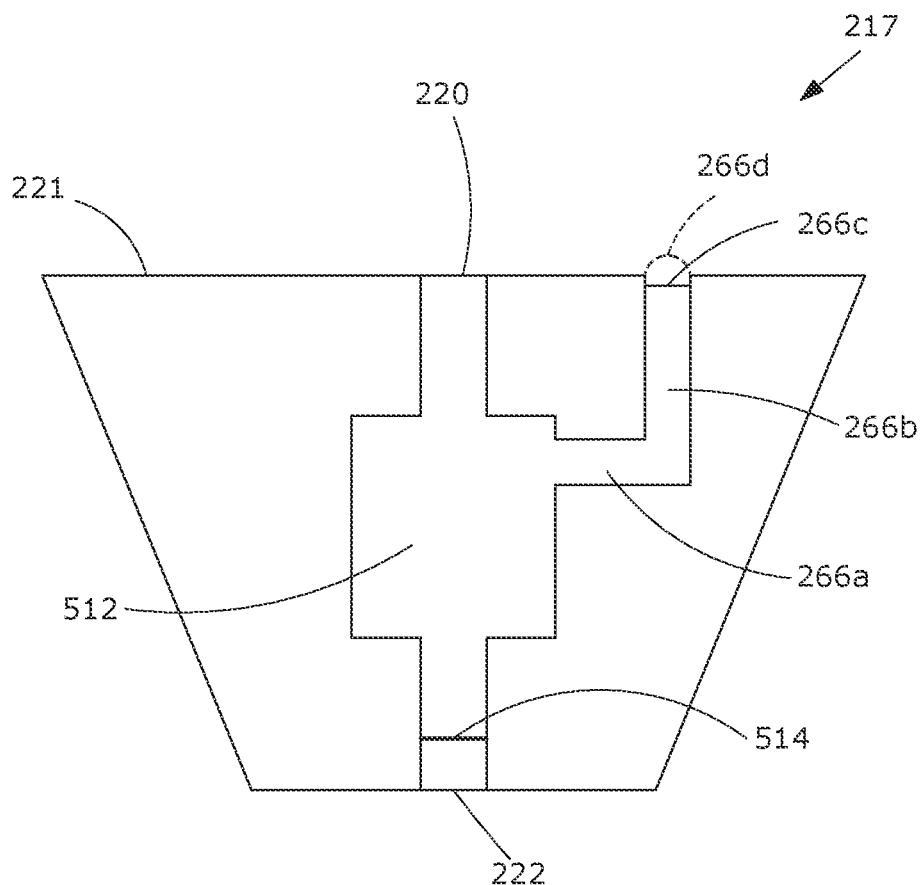
FIG. 5a is a side section view of a fifth embodiment closure device.
Figure 5B:
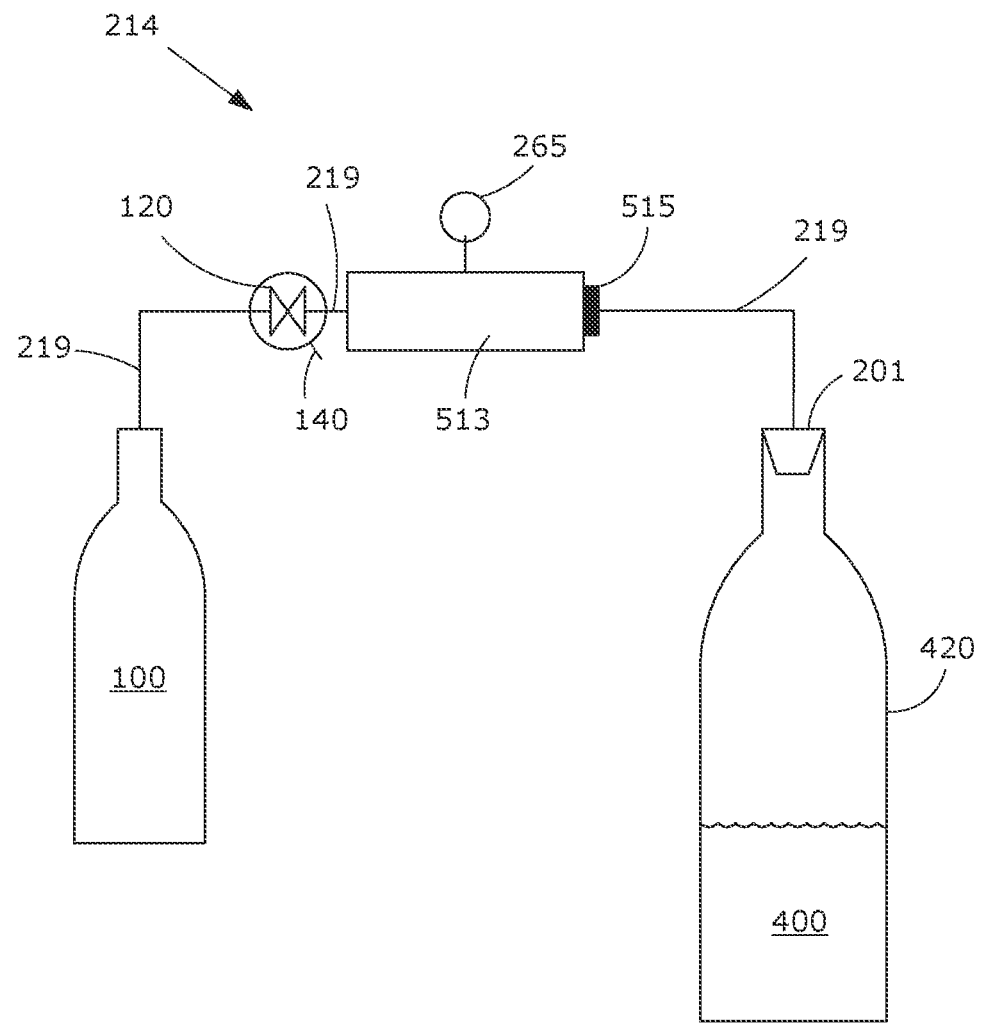
FIG. 5b is a side view of an alternative embodiment valve mechanism.

Alternative embodiments are shown in FIGS. 5a, and 5b. These embodiments show alternative devices and methods of metering a set amount of inert gas 180.

In FIG. 5a, a fifth embodiment closure device 217 is shown comprising a metering chamber 512 that can hold a certain amount of inert gas 180. Once this chamber is filled at a predetermined pressure, the dump valve 514 will open and the pressure sensor 266c can indicate success to the user. The pressure sensor 266c can be a diaphragm. The pressure will travel through the channels 266a, 266b to cause the diaphragm to rise to an extended 266d, which is visible to the user. When the pressure falls, the diaphragm will fall to a lowered position. The lowered position can be located at, below, or just above at top surface 221 of the device 217.

In operation, an inert gas source will be applied at the port 220. This will cause pressure to rise within the metering chamber 512. As the pressure rises, the sensor 266c will rise, such as to or toward the raised position 266d. This rising will be visible to the user. The dump valve is biased to a closed position. The dump valve is configured to open when a predetermined open pressure is reached. When the pressure within the metering chamber reaches the predetermined open pressure of the dump valve, the dump valve will open allowing the inert gas to pass the valve, out of the port 222 of the device 217, and travel into the adjoined container 420. When the dump valve opens pressure within the metering chamber 512 will fall to atmospheric pressure. Since sensor 266c is in communication with the metering chamber, the drop in pressure in the metering chamber will cause the sensor 266c to fall to the lowered position. This movement of the sensor 226 will be visible to the user and will indicate that the predefined amount of inert gas has been administered through the device. The sensor 266c falls to the lowered position because the pressure on both sides of the sensor will equalize when the dump valve opens, at least when no further inert gas is administered. Even if the user continues to administer inert gas through the device after the dump valve is open, the pressure in the container 420 is likely to be lower than the pressure in the metering chamber when the open pressure is reached. Therefore, at least some drop in pressure on the metering chamber side of the sensor 266c will occur, and therefore the sensor 266c will fall at least some amount, which will be visible to the user.

In one example, to put in 0.15 g to 0.50 g of argon to preserve wine—the chamber 512 will be 0.025 L to 0.1 L for upstream pressures between 50 psig and 150 psig. An upstream pressure regulator could also be used to enhance this process.

FIG. 5b shows a valve mechanism 214 comprising conduit 219, a valve 120, an actuator 140, a metering chamber 513, and a dump valve 515. The conduit 219 is connected the source 100, to the valve 120, to the metering chamber 513, and to the dump valve 515, to the closure device 201. In some embodiments, one or more of the valve 120, metering chamber 513, and the device 201 may be directly joined rather than being connected with conduit. The metering chamber is configured to hold a predefined amount of inert gas 180. Once this chamber 513 is filled at a predetermined pressure, the dump valve 514 will open and the pressure sensor 265 can indicate to the user a successful application of inert gas to the container 420 through the pressure dropping. In some embodiments, the pressure sensor 256 comprises a diaphragm and is configured to fall to indicate that a predefined amount of inert gas has been administered through the chamber, in the same manner that sensor 266c operates. Similar volumes and pressures as disclosed for device 217 can be used with the metering chamber and dump valve 514 of FIG. 5b. The closure device 201 used with valve mechanism 214 and device 201 may only include the channel 226 and valve 224, but not sensor 264, chamber 262, channels 261, indicator 278, since they are replaced with pressure sensor 256 and the chamber 513 outside of the closure device 201.

A sixth embodiment closure device 600 is shown in FIG. 6a. The closure device 600 provides for an indication of negative pressure (vacuum) in addition or instead of previously described positive pressure. This would be useful for preventing oxidation of certain types of oxygen sensitive items, such as solid foods. The use of vacuum may or may not be used in conjunction with inert gases or carbon capture oxygen scavengers.

The device 600 is capable of indicating pressure below atmospheric pressure, i.e. a vacuum. The device 600 is similar to the device 201 except as shown and described.

A one-way valve 604 is flipped from the orientation of valve 224 of device 201. Therefore the valve 604 allows gas to be drawn out of the enclosed container 420, when the device 600 is attached to the container 420, rather than pushed in. The valve allows gas to flow upward in the direction G of FIG. 6a, but not in the opposite direction H. The pressure sensing element 606, which may be a diaphragm, resists motion toward the enclosed container 420 and toward the bottom 205. The pressure sensing element 606 is biased toward a top wall 263.

An indicator 670 comprises a no vacuum indication section 672, a transition area vacuum indication section 674, and an adequate vacuum indication section 676.

A vacuum resistance spring 680 may be employed to improve operational integrity. The spring 680 spirals around the indicating cam 270 and pushes against the top 209 of the closure device housing 601 and a barb 603. The barb is attached to the indicating cam 270. This spring 680 is sized in conjunction with the pressure sensing element 606 such that it moves to a set position at the desired negative (vacuum) pressure. For example, the spring 680 and pressure sensing element 606 can each be sized so that section 672 is hidden beneath the surface 209 and section 676 is visible when a predefined amount of negative pressure is in the chamber 262 and therefore in the adjoined container 420.

The no vacuum indication section 672 is fixed or formed to the top of the indicating cam 270. The transition area vacuum indication section 674 is adhere on top of section 672. The adequate vacuum indication 676 on top of section 674. In some embodiments, these sections are set up such that at atmospheric pressure, all sections are showing externally from the closure device 201 and above surface 209, and at a set negative, vacuum, pressure, only the adequate vacuum pressure 676 is visible above the surface 209 and section 674 and 672 are hidden below the surface 209 within the housing 678.

The indicating sections 672, 674, 676 may be made of the same or similar material or manufactured as one piece. Methods of showing which section corresponds can include color differentiations, one color lines in between, a scoring or recess between sections, or other visual markings.

In operation, the device 600 is deployed at an opening 460 of the container 420. A source of vacuum such as a vacuum pump 610 is used to pull gas out of the enclosed container 420. This pump may be hand operated, or a motor driven system as pictured in FIG. 6b. A vacuum hose 612 is attached to the output port of the pump 610 at one end. The opposite end of the hose 612 is connectable to the external inlet port 220 of the device 600. The pump is operated to pull out the gas in the container 420, through the channel 226 and the one-way valve 604.

As the pressure inside the container 420 decreases, the pressure sensing element 606 is drawn downward in the direction H of FIG. 6a. The indicating cam 270 moves downward with the pressure sensing element 606. The movement of the cam 270 pulls downward the indication sections 672, 674, and 676. The user will know that the desired negative (vacuum) pressure has been reached when the no vacuum indication section 672 and vacuum transition section 674 have been pulled below the surface 209 and into the housing 603.

Figure 7A:
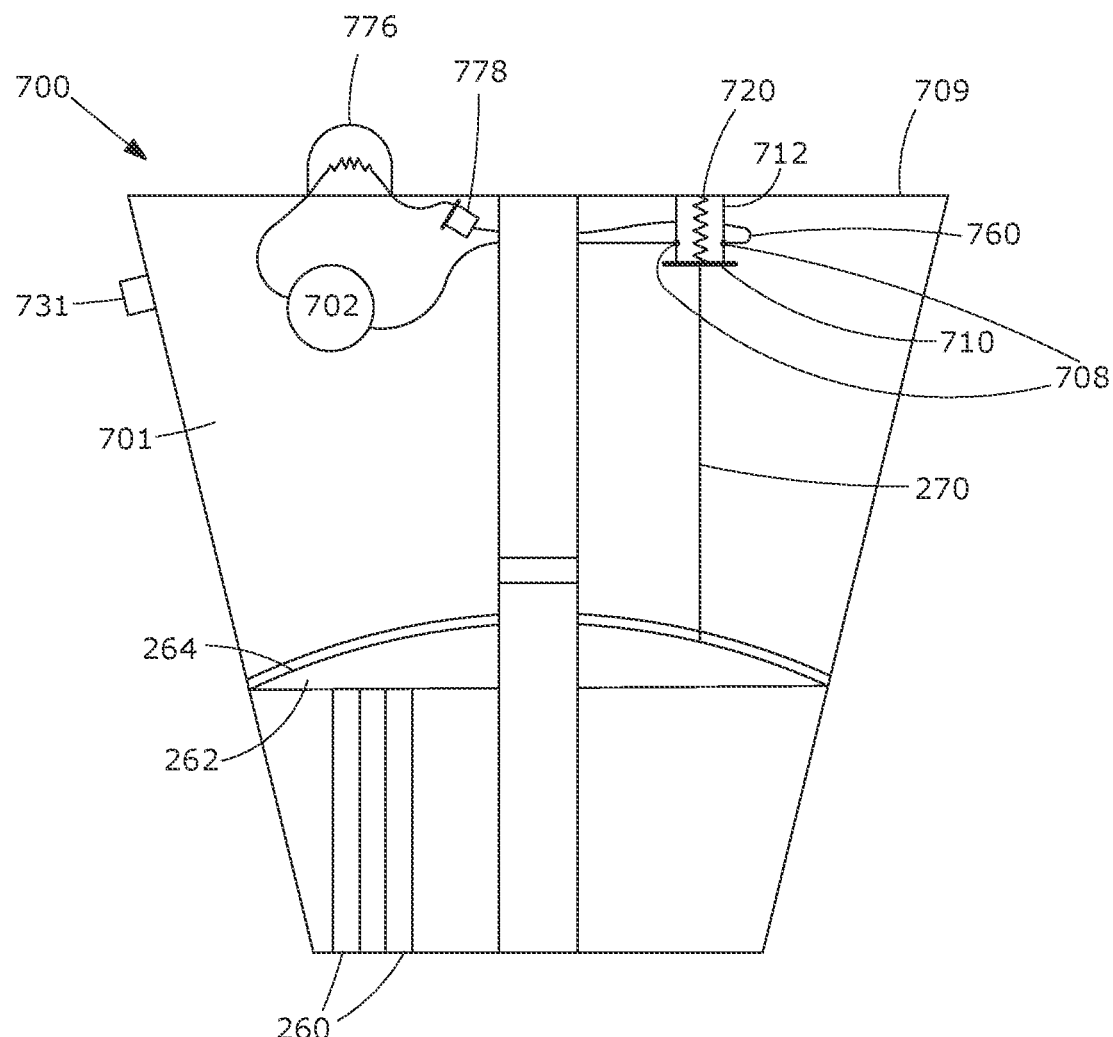
FIG. 7a is a side section view of a seventh embodiment closure device.

A seventh embodiment closure device 700 is shown in FIG. 7a. This embodiment shows that indicating successful dose application to the user can involve use of an electronic circuit. In one embodiment, this circuit is energized when the pressure inside the enclosed container 420, which the device 700 is connected to, is raised to a predefined setpoint that corresponds to the successful dose. When the circuit is energized an indication is caused to the user, such as by the use of a light, an audible sound, a wireless signal emission, such as a radio frequency emission.

The device 700 shown in FIG. 7a provides a visual indication that the pressure inside the enclosed container 420 is at a predefined set point. The device of 700 is similar to device 201, except as shown and described. As compared to the device 201, device 700 does not have the visual indication sections 272, 274, and 276. Device 700 comprises a circuit 703. The circuit 703 comprises a power source, such as battery 702, a switch, such as a pressure switch connector 710, and a light emitting diode (LED) 776.

In some embodiments, the circuit may further comprise two or more switch connections 708, switch connection brackets 712, a wire 760, and an optional wireless transmitter, such an RF transmitter 778. The device further comprises a pressure switch resistance spring 720.

Figure 7B:
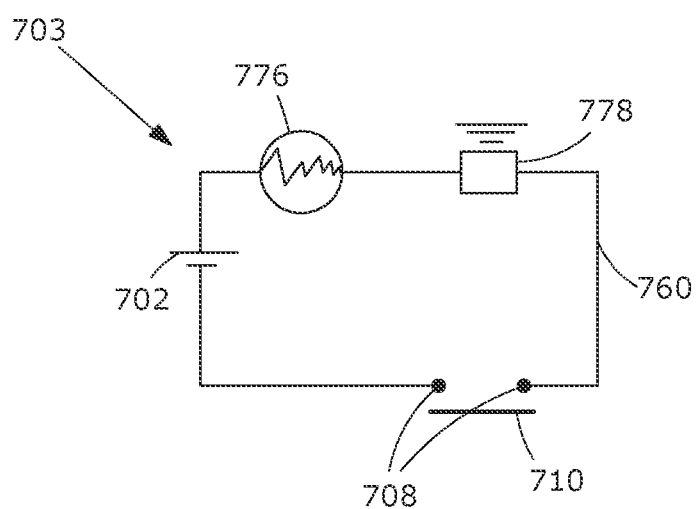

FIG. 7b provides a circuit diagram of circuit 703. The circuit is energized when the pressure switch connector 710 is pressed against the pressure switch connections 708. Upon energizing, the completed circuit allows electricity provided by the power source 702 to flow and energize the LED 776 and the wireless, such as RF, transmitter 778.

The pressure switch connector 710 is biased away from the pressure switch connections 708 by the resistance spring 720. The resistance spring is seated against an internal stop adjacent the top wall 709 of the device 700. The wiring 760 can be routed internally within the device 700 as space allows. In some embodiments, the connections 708 are adhered to connector brackets 712 to hold them in a fixed position. These brackets 712 are adhered an internal wall or support of the device 700. The brackets may be attached or formed as one with the device 700. The pressure switch connector 710 is comprised of conductive materials such as copper or other metals to allow the electrical current to flow and is attached to the indicating cam 270.

In operation, the device 700 operates similarly to device 201. However, in device 700, as the pressure rises within the joined container 420 and within the chamber 262, the pressure switch 710 moves upward with the indicating cam 270 toward the connections 708. At a predefined pressure, the pressure switch 710 contacts the circuit connections 708. The circuit energizes and the LED 776 emits light and optionally the wireless transmitter emits a wireless signal. In the case a RF transmitter 778 is used, it emits a radio frequency signal. This emission of light cues the user that enough gas has entered the enclosed container 420. Although this embodiment provides visual cues, the LED 776 could be replaced with a component that emits sound instead of light to perform an indicating function to the user. In some embodiments, the LED is not included and an indication is provided by the wireless transmission.

Figure 7C:
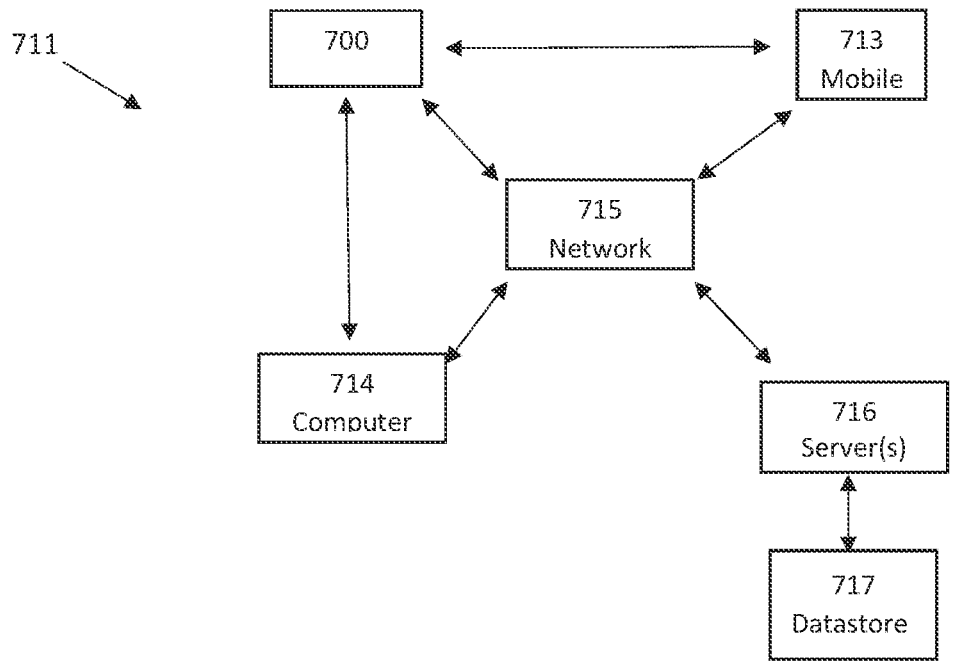
FIG. 7c is a system diagram of an exemplary system environment where an embodiment of the invention can be implemented.

FIG. 7c shows an exemplary system environment 711 that the device 700 can operate in. The device may communicate, via wired or wireless connection, with an electronic device, such as a mobile electronic device 713 or other computer 714. The device may also communicate with a server 716 that may be in communication with the mobile electronic device 713 and/or the computer 714. The mobile electronic device 713 may be a smart phone or tablet. In some embodiments, the device 700 may be configured to communicate directly with the mobile device 713 or computer, via wired or wireless communications. In some embodiments, the communications among the devices in the environment 711 may be on a cellular network, a Wide Area Network (WAN), a Local Area Network (LAN), or a Personal Area Network (PAN), or a combination of these or other networks. Network 715 may comprise multiple networks. In some embodiments, the communications among the devices in the environment 711 is according to a Wi-Fi protocol such as IEEE 802.11, a Bluetooth protocol, a cellular protocol, radio transmission, or a combination of two or more these or other protocols or standards.

In some embodiments, each of the device 713, computer 714, and server 716 comprises a central processing unit (CPU), a memory, a wired and/or wireless communication device, an input device, and an output device. The CPU may be connected to the other components by a central bus. The input and output device may be combined, such as in the case of a touch screen.

Figure 7D:
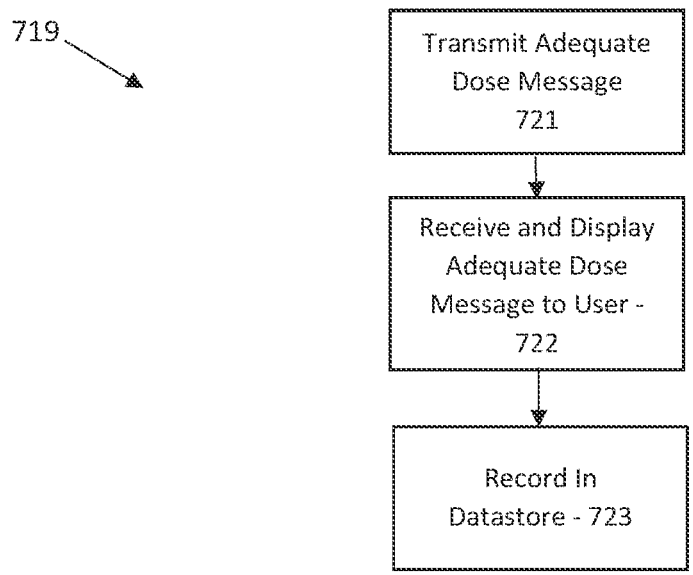
FIG. 7d is a flow diagram of an exemplary notification function of an embodiment of the invention.

FIG. 7d shows an exemplary notification function 719. At step 217, the device 700 transmits wired or wirelessly to device 713 or computer 714 a message that an adequate dose has been administered by the device 700. The device 713 or computer 714 will receive and display a message to the user indicating that an adequate dose has been administered by the device 700. In some embodiments, at step 723, the device 713 or computer 714 saves this message to its local datastore, such as a database. In some embodiments, at step 723, the message is transferred to a sever 716 that saves the message in a datastore 717, such as a database.

In some embodiments, the adequate dose message is transferred to the server 716 first and the server 716 sends a message to the device 713 or computer 714 indicating an adequate dose has been administered. The server records the adequate dose message in the datastore 717. The device 713 or computer 714 displays a message or indication to the user that an adequate dose has been administered.

FIG. 7e shows an exemplary datastore record 725. The record 725 comprises an adequate dose indication received section indicating whether an adequate dose indication has been received from the device 700, a date stamp section for the date when an adequate dose indication is received, a time stamp section for the time when an adequate dose indication is received, an item section for a description or identifier of the oxygen sensitive item in the container that the device 700 is deployed to preserve, a date opened section for the date when the container having the oxygen sensitive item was first opened, a time opened section for the time when the container having the oxygen sensitive item was first opened, and a device ID section for the an identifier corresponding to device 700.

The date and time opened section may be manually entered by a user at device 713/714 or the device 700 may be configured with an open button (not shown) that a user can press to indicate when the container of the oxygen sensitive item is opened. When the open button is pressed the device 700 will send a message to the device, computer, or server 713/714/or 716 indicating that container is open and the device 713/714/or 716 will record the open date and time stamp information in the corresponding sections of the record 725. The device, computer, or server can calculate how long the container of the oxygen sensitive item has been opened by comparing the current date and time to the opened date and time in the record 725.

Multiple devices 700 can be used on various containers of oxygen sensitive items. Therefore, the device ID section of the record 725 records the device ID corresponding to a given device 700. Each device 700 will have a unique device ID. This enables tracking, in one or more datastores, of multiple containers of oxygen sensitive items, each using a difference one of devices 700.

In some embodiments, the device 700 has a side contact switch 731 positioned to be depressed when the device 700 is deployed at the opening 460 of the container 420. Therefore, when the device 700 is deployed on a container 420 the friction fit of the device 700 in the opening 460 will cause the side wall of the container 420 adjacent the neck of the container to depress the switch 731. When the switch is released, the device can send a container open message to the device, computer, or server 713/714 or 716 indicating that the device 700 is no longer deployed on the container. This indicates that the oxygen sensitive idem in the container is likely exposed to oxygen. Date and time stamps when the container open message is received can be recorded in the datastore. When the switch is depressed a container closed message can be sent to the device, computer, or server 713/714/or 716 indicating that the device 700 is deployed on the container. Date and time stamps when the container closed message is received can be recorded in the datastore. Therefore, the system, such as at the device, computer, or server 713/714/or 716, can track how long a container is open and therefore how long the item in the container has been exposed to oxygen. The system can monitor the quality or spoilage of inventory.

Further, by tracking the number of times an adequate does message is received from the device 700, the system, such as at the device 713, computer 714, or server 716, can calculate the number or uses of the inert gas source 100 and therefore the amount of the inert gas used. Moreover, the system can track the number of times an oxygen sensitive item, corresponding to a given device 700, has been preserved.

Figure 8A:
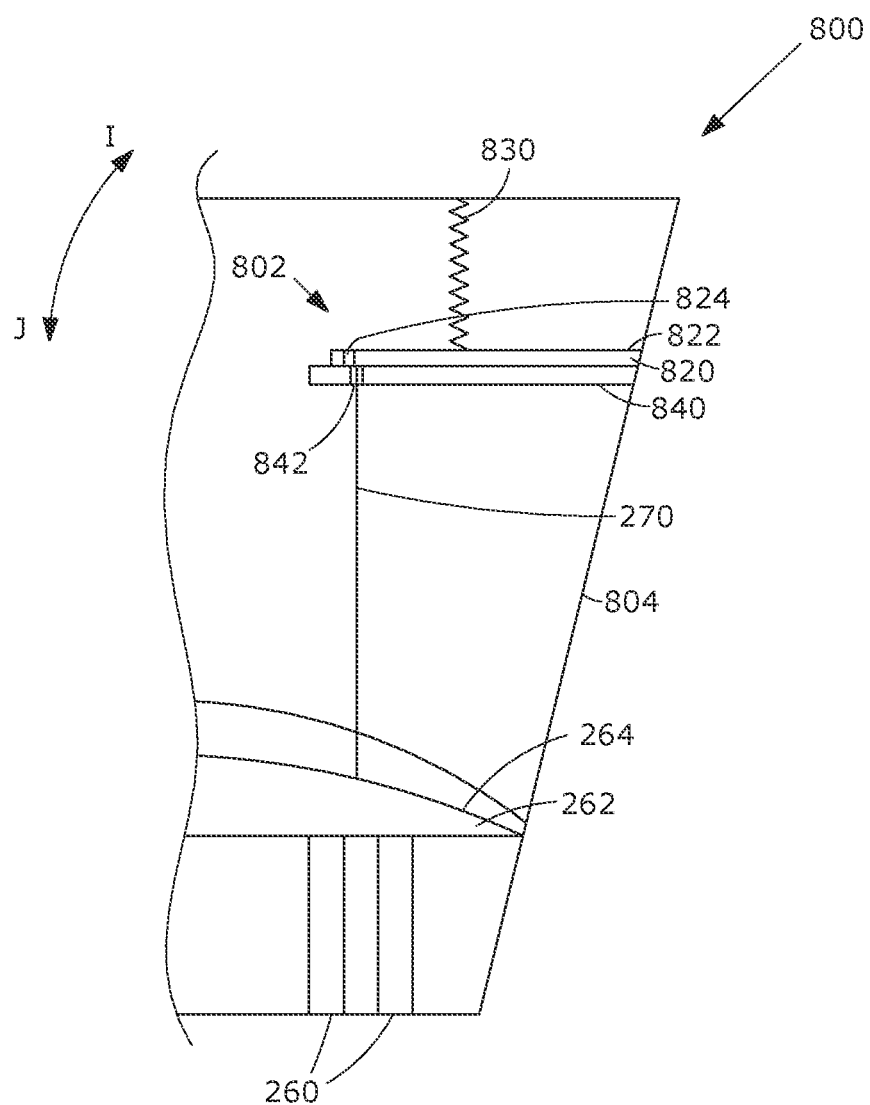
FIG. 8a is a fragmentary side section view of an eighth embodiment closure device.

An eighth embodiment closure device 800 is shown in FIG. 8a. The device comprises a mechanism 802 for providing an audible indication that a predefined of amount of pressure is in the attached container 420, and therefore a predefined dose of inert gas has been administered into the container 420. The mechanism 802 comprises a slip mechanism and a striking material to cause an audible sound.

The device 800 is similar to device 201 except as shown and described. The indicating cam 270 moves the slip mechanism as driven by the pressure sensing element 264 as described regarding device 201. However, instead of moving a pressure indication section 272, 274, and 276, in device 800 the cam 270 drives and moves a slapping beam 820 that will slip and strike a striking beam 840 at a predefined pressure setpoint.

As compared to device 201, device 800 lacks the visual indication sections 272, 274, and 276. Device 800 comprises the slapping beam 820, the striking beam 840, a slip hole 824, and optionally a slip resistance spring 830.

The slapping beam 820 is comprised of a bendable material such as polyethylene terephthalate, polypropylene, or other suitable material that allows it to bend in a repeatable manner. Alternatively, a hinge could be added at the base 822 of the slapping beam 820 if used in conjunction with the slip resistance spring 830. The slapping beam 820 is attached to an internal portion of the housing of the device 800 or created as one piece with the housing of device 800.

The slapping beam 820 has a slip hole 824 which is a hole that is larger in size than that of the indicating cam 270 circumference, such that the cam 270 can move vertically through the slip hole 824, if aligned.

The slapping beam 820 is, without pressure inside the enclosed container 420, flush to a striking beam 840. The striking beam 840 is attached to or formed with an internal portion of the housing of the device 800 for support. The material of the striking beam 840 may be polyethylene terephthalate, polypropylene, metal, or other suitable material that can be made rigid and makes an audible noise when the slapping beam 820 strikes the striking beam 840. The striking beam 840 also has a hole 842 that is at least as wide as the indication cam 270 and the slip hole 824. This hole 842 in the striking beam 840 is large enough and positioned such that the indicating cam 270 will move freely within it even if slightly bent and even if the cam 270 slips through the slip hole 824.

The slip hole 824 is positioned in conjunction with the indicating cam 270 such that when the slapping beam 820 is bent by the indicating cam 270 at the predefined pressure setpoint, the indicating cam 270 will slip through the slip hole 824. Once the indicating cam 270 slips into the slip hole 824 the slapping beam 820 will fall as biased by its bent position or by the spring 830 and hit the striking beam 840, causing an audible sound. Although other positions may work, the slip hole 824 is aligned further, horizontally, from the base 822 than hole 842 and the indicating cam 270 when the cam is in a home position without pressure in the chamber 262 or the enclosed container 420.

In operation, the device 800 operates similarly to the device 201. However, in the device 800, as the pressure rises the slapping beam 820 moves upward and clockwise in the direction I of FIG. 8*a*, as the indicating cam 270 pushes vertically against it. As the slapping beam 820 moves, the slip hole 824 moves horizontally towards the shell of the closure device 201 given the clockwise arch about a pivot location at the base 822. At the predefined pressure, the indicating cam 270 aligned with and slips into the slip hole 824. Once the indicating cam 270 slips into the slip hole 824 the slapping beam 820 will fall as biased its bent position or by the spring 830 and hit the striking beam 840, causing an audible sound. The slapping beam 820 will move downward in the direction J and the slapping beam will move along the cam 270 at the hole 824. The release of the slapping beam 820 comes to a sudden stop on the striking beam 840, the impulse of which makes an audible sound the cues the user that the desired predefined pressure has been reached.

While the closure device and pressurized source of inert gas are shown as two separate items in FIGS. 1*a*, 1*b*, 1*c*, 1*d*, 2*a*, 2*b*, 2*c*, in some embodiments the closure device and pressurized source of inert gas are formed or joined as one piece, which includes the closure, source, and indication means.

Figure 2I:
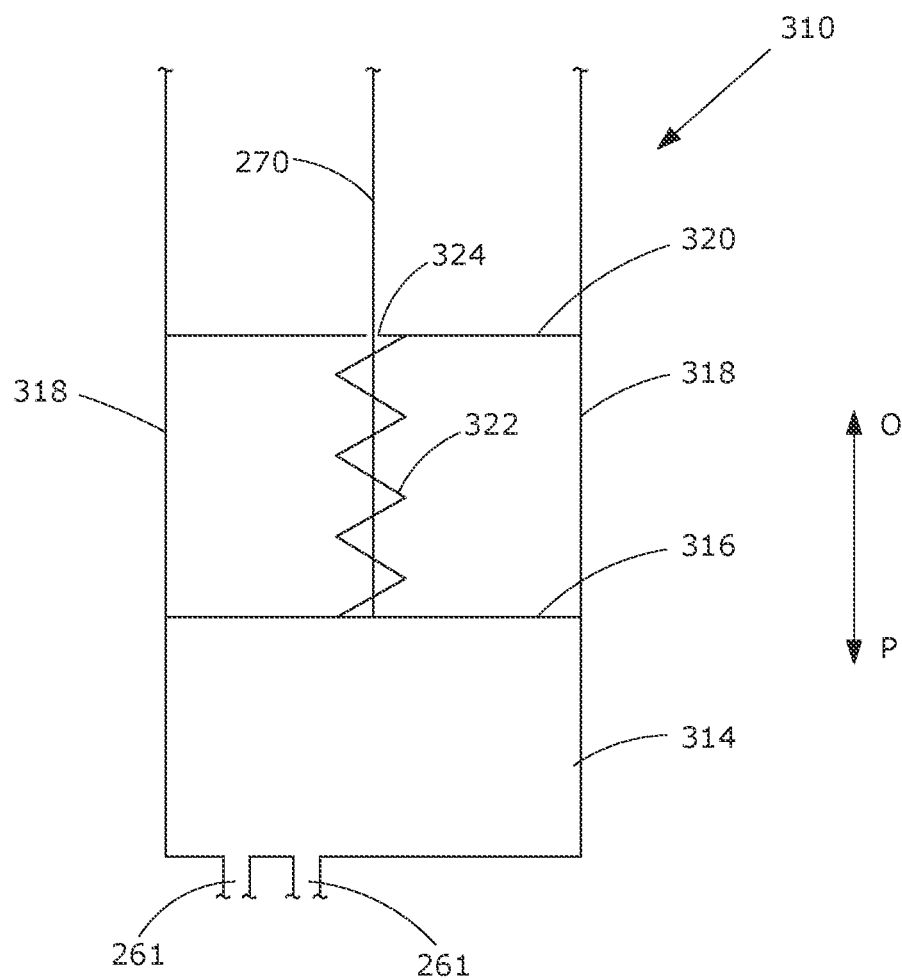
FIG. 2i is a side section view of a spring pressure sensing arrangement of an embodiment of a closure device of the invention.

In some embodiments, the pressure sensing element 264, such as a diaphragm, and chamber 262 of the closure device 201 is replaced with a spring pressure sensing arrangement 310, as shown in FIG. 2*i*. The chamber 262 is replaced with chamber 314. The channels 261 are in communication with the chamber 314. The chamber 314 comprises a movable member, such as a disk 316. The disk 316 provides a sealed contact with the sidewall 318 of the chamber so gas cannot pass to an upper side of the disk. A stop wall 320 is located above the disk 316. A spring is positioned between the stop wall 320 and the disk 316. The spring biases the disk away from the stop wall 320. The cam 270 is fixed to a top side of the disk 316. The cam 270 passes through an aperture 324 in the stop wall 320 so that the cam can extend up to connect with the indicator 278.

As pressure increase in the adjoined container 420, pressure will build in the chamber 314 via the channels 261. The rising pressure will cause the disk 316 to rise upward is the direction O of FIG. 2*i* and A of FIG. 2*b*. This rising disk will cause the cam to also rise, as it is affixed to the disk. The rise of the disk and the cam is resisted by the spring. A predefined pressure in the chamber 314 will cause the disk and the shaft to rise a predefined amount. The spring can be selected or configured for the desired vertical travel for a predefined pressure. When that predefined pressure is reached the cam will have traveled sufficiently to indicate to a user at the indicator 278 that an effective or predefined dose of inert gas has been administered to the container. When pressure is reduced the spring 322 will move the disk and the cam downward in the direction P of FIG. 2*i*. The spring pressure sensing arrangement 310 can be deployed in any of the closure embodiments disclosed herein in place of element 264 and chamber 262.

In some embodiments, it is possible to provide the effective dose of 0.15 grams to 0.50 grams of inert gas, such as argon gas, by providing user instructions. The timeframe to spray the inert gas 180 into the container 420 can be instructed with a designed flow rate to meter the dose.

The flow rate of argon gas can be controlled through the nozzle 160 or valve 120 based on the opening sizing and the pressure inside the bottle of gas 100. The user can be instructed to hold the actuator 140 spray for a designated amount of time such that the flow rate multiplied by the time instructed equals the effective dose.

For example, a bottle of gas 100 is at a pressure of 155 psig and the valve 120 with a 1 mm opening may allow 0.17 grams per second of argon gas through it. The valve 120 can be designed with different openings and piping angles such to increase or decrease the flow rate to a predefined amount. A user that sprays for one to two seconds, by counting or using a timing device, will put 0.17 grams to 0.34 grams into the container 420, thereby providing the effective dose of argon gas to preserve wine.

As the pressure decreases when the container is almost empty (at 30 psig), the flow rate slows to 0.8 grams per second. A user can be instructed to count or use a timing device to ensure they are spraying two seconds to provide the adequate dose to preserve wine.

Another method of providing the effective dose of 0.15 grams to 0.50 grams of argon gas is to measure the weight of the bottle of gas 100 before and after providing a dose of argon, or during use with a mass reading scale.

At least one embodiment of the oxygen sensitive item preserver device and method: 1) provides a simpler and consistent method of preserving oxygen sensitive items, 2) has a defined dose of argon that preserves wine without wasting the limited source of inert gas, 3) a more sustainable, recyclable source of inert gas for preserving oxygen sensitive items than prior alternatives that exist 3) meters the effective dose of argon for oxygen sensitive items, such as wine, 4) provides an indication of successful application to the users, and 5) is less cumbersome, expensive, and bulky as other wine preservers.

While the above description contains many specificities, these should not be construed as limitations on the scope, but rather as an exemplification of several embodiments thereof. Many other variations are possible, for example, the materials for a closure device are generally described as circular and made of plastics such as PTFE. However, other geometries may be utilized to accomplish hermetic sealing of an open container. Furthermore, materials other than the plastics described may be used, such as natural cork, to accomplish hermetic sealing of an open container and comprising the closure device.

Also, the inert gas utilized is in the examples and in the case of wine is the inert gas argon. However, other inert gases such as nitrogen, helium, neon, helium, carbon dioxide and any mixture of the inert gases could be used in place of or in addition to argon.

In addition, oxygen sensitive items may include: wine, whiskey, liqueurs, coffee beans, spices, produce, carbohydrate heavy foods (such as potato chips), fish, meat, cooking oils and other food and beverage items. More non-food and non-beverage examples items such as paint, oil, wood sealer, lubrication oils, fuel oils, etc. These are examples of oxygen sensitive items and not a comprehensive list. Any item that has an undesirable oxidation reaction to a user is considered an oxygen sensitive item.

From the foregoing, it will be observed that numerous variations and modifications may be effected without departing from the spirit and scope of the invention. It is to be understood that no limitation with respect to the specific apparatus illustrated herein is intended or should be inferred. For example, one or more component or embodiments may be combined, modified, removed, or supplemented to form further embodiments within the scope of the invention. As a further example, steps provided could be carried out in a different order to achieve desired results. Further, steps could be added or removed from the processes described. Therefore, other embodiments and implementations are within the scope of the invention.

The invention claimed is:

1. A method of preserving an oxygen sensitive item against oxidation, comprising the steps of:
    injecting at least 0.15 gram of an inert gas into a container comprising the oxygen sensitive item and oxygen, without raising a pressure within the container above 10 psig, to form a barrier layer of the inert gas between the oxygen sensitive item and the oxygen in the container without displacing all of the oxygen from the container.

2. The method of claim 1, wherein the step of injecting is further defined in that the inert gas is argon.

3. The method of claim 1, wherein the step of injecting comprises the step of raising the pressure within the container to between 6 psig and 10 psig with the inert gas injected.

4. The method of claim 1, wherein the step of injecting comprises the step of repeatedly raising the pressure within the container to between about 2 psig and 3 psig with one continuous injection of the inert gas until at least 0.15 gram of the inert gas is contained in the container.

5. The method of claim 1, wherein the step of injecting comprises the step of repeatedly raising the pressure within the container to 3 psig with one continuous injection of the inert gas until at least 0.15 gram of the inert gas is contained in the container.

6. The method of claim 1, comprising the step of providing a visual indication to a user when the container comprises at least 0.15 gram of the inert gas.

7. The method of claim 1, comprising the step of providing an audible indication to a user when the container comprises at least 0.15 gram of the inert gas.

8. The method of claim 1, wherein the injecting comprises the steps of,
    attaching a nozzle of a source of the inert gas to an inlet port of a closure device attached to an opening of the container, the closure device sealing the container closed;
    actuating a valve of the source of the inert gas to cause the inert gas to flow to the inlet port, through an inlet channel of the closure device, and into the container; and,
    blocking an escape of gas from the container with a one-way valve in the inlet channel.

9. The method of claim 8, comprising the step of indicating to a user when the container comprises at least 0.15 gram of the inert gas.

10. The method of claim 9, wherein the step of indicating comprises, driving a diaphragm within a chamber of the closure device to an extended position with the pressure generated by the injecting of the inert gas, and moving an indicator to an indicating position with the diaphragm.

11. The method of claim 9, wherein the step of indicating comprises, driving a diaphragm within a chamber of the closure device to an extended position with the pressure generated by the injecting of the inert gas, and actuating an audible mechanism to cause an audible sound.

12. The method of claim 9, wherein the step of indicating comprises filling a metering chamber with gas from the container and after a predetermined pressure is reached within the metering chamber overcoming a dump valve and moving a visual indicator by a pressure from the metering chamber.

13. The method of claim 9, wherein the step of indicating comprises displaying the pressure within the container with a meter of the closure device.

14. The method of claim 1, comprising the steps of,
    sensing with a pressure sensing element the pressure generated by the injecting of the inert gas; and
    activating an electronic circuit to emit a wireless signal in response to the sensing of the pressure generated by the injecting of the inert gas; and,
    receiving on a remote electronic device the wireless signal.

15. The method of claim 14, wherein the step of receiving comprises the step of recording the wireless signal received in a datastore along with a date stamp and a time stamp corresponding to the wireless signal.

16. The method of claim 14, comprising the step of displaying on the remote electronic device a success indication.

17. The method of claim 14, wherein the step of indicating comprises the step of displaying on the remote electronic device the pressure within the container.

18. The method of claim 1, wherein the step of injecting comprises the steps of,
    attaching a nozzle of a source of the inert gas to an inlet port of a closure device attached to the container, the closure device sealing the container closed;
    actuating a valve of the source of the inert gas to cause the inert gas to flow to the inlet port, through an inlet channel of the closure device, and into the container;
    and wherein the method comprises allowing the oxygen to exhaust from the container through an exhaust channel in the closure device.

19. The method of claim 18, wherein the step of allowing the oxygen to exhaust comprises the step of delaying the opening of the exhaust channel until a predefined time after injecting is complete or until a predefined pressure is reached in the container.

20. The method of claim 1, wherein the injecting comprises
    attaching a nozzle of a source of the inert gas to an inlet port of a closure device attached to the container, the closure device sealing the container closed;
    actuating a valve of the source of the inert gas to cause the inert gas to flow to the inlet port, through an inlet channel, and into the container;
    resisting a closed bias of the valve to cause the valve to be open for a predetermined amount of time after the valve is released by a user.

21. The method of claim 20, wherein the step of resisting comprises resisting the closed bias of the valve with a spring or a friction material.

22. The method of claim 1, wherein an opening of the container is hermetically closed with a closure device.

* * * * *